United States Patent
Wang et al.

(10) Patent No.: US 10,873,972 B2
(45) Date of Patent: Dec. 22, 2020

(54) METHOD AND EQUIPMENT FOR CHANNEL SENSING AND SIGNAL TRANSMISSION

(71) Applicant: Samsung Electronics Co., Ltd., Suwon-si (KR)

(72) Inventors: Yi Wang, Beijing (CN); Shichang Zhang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 15/204,283

(22) Filed: Jul. 7, 2016

(65) Prior Publication Data
US 2017/0019924 A1 Jan. 19, 2017

(30) Foreign Application Priority Data
Jul. 16, 2015 (CN) .......................... 2015 1 0419423

(51) Int. Cl.
*H04W 74/08* (2009.01)
*H04L 5/00* (2006.01)

(52) U.S. Cl.
CPC ......... *H04W 74/0808* (2013.01); *H04L 5/005* (2013.01); *H04L 5/0053* (2013.01); *H04L 5/0092* (2013.01); *H04L 5/001* (2013.01)

(58) Field of Classification Search
None
See application file for complete search history.

(56) References Cited

U.S. PATENT DOCUMENTS

| | | | | |
|---|---|---|---|---|
| 2012/0113816 A1* | 5/2012 | Bhattad | ................. | H04L 5/0032 370/246 |
| 2015/0092582 A1 | 4/2015 | Liao et al. | | |
| 2015/0092655 A1* | 4/2015 | Liao | ...................... | H04J 11/005 370/312 |
| 2015/0092768 A1* | 4/2015 | Ng | ........................ | H04W 48/16 370/350 |

(Continued)

FOREIGN PATENT DOCUMENTS

CN 105515741 A 4/2016

OTHER PUBLICATIONS

Qualcomm Incorporated, "Considerations on RRM measurements for LAA-LTE", 3GPP Draft, R2-152708 LAA RRM, 3rd Generation Partnership Project (3GPP), Mobile Competence Centre, 650, Route Des Lucioles, F-06921 Sophia-Antipolis Cedex, France, vol. RAN WG2, No. Fukuoka, Japan, May 24, 2015 (May 24, 2015), XP050972115.

(Continued)

*Primary Examiner* — Gregory B Sefcheck
*Assistant Examiner* — Srinivasa R Reddivalam
(74) *Attorney, Agent, or Firm* — Jefferson IP Law, LLP

(57) ABSTRACT

A method for channel sensing and signal transmission is provided. The method includes that a signal transmission mode of a communication node in a predefined time window is different from a signal transmission mode of the communication node outside the predefined time window, which includes at least one of a channel sensing mode and a data transmission mode. By performing the method, a frequency domain multiplexing coefficient among nodes adopting the same access technology can be improved, and the coexistence of the access technology and others can be ensured.

10 Claims, 27 Drawing Sheets

(56) References Cited

U.S. PATENT DOCUMENTS

| | | | |
|---|---|---|---|
| 2015/0172950 A1 | 6/2015 | Chen et al. | |
| 2015/0373682 A1* | 12/2015 | Bashar | H04W 48/16 370/330 |
| 2016/0036617 A1* | 2/2016 | Luo | H04L 27/2662 375/260 |
| 2016/0227578 A1* | 8/2016 | Lee | H04W 74/004 |
| 2016/0234706 A1* | 8/2016 | Liu | H04L 5/0048 |
| 2016/0286579 A1* | 9/2016 | Park | H04W 16/14 |
| 2016/0301556 A1* | 10/2016 | Nory | H04L 5/0053 |
| 2016/0302180 A1* | 10/2016 | Nory | H04L 5/0096 |
| 2017/0030246 A1 | 2/2017 | Baek et al. | |
| 2017/0237463 A1* | 8/2017 | Zheng | H04W 56/00 370/328 |
| 2017/0318607 A1* | 11/2017 | Tiirola | H04W 74/0808 |
| 2017/0353912 A1* | 12/2017 | Einhaus | H04W 48/12 |

OTHER PUBLICATIONS

ZTE, "Discussion on RRM measurement and DRS design for LAA", 3GPP Draft, RI-151806 Discussion on RRM Measurement and DRS Design for LAA, 3rd Generation Partnership Project (3GPP), Mobile Competence Centre, 650, Route Des Lucioles, F-06921 Sophia-Antipolis CED, vol. RAN WG1, No. Belgrade, Serbia, Apr. 19, 2015 (Apr. 19, 2015), XP050934667.

Kyocera, "DRS Design for LAA", 3GPP Draft, RI-153105, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 24, 2015 (May 24, 2015), XP050971297.

"3rd Generation Partnership Project; Technical Specification Group Radio Access Network; Study on Licensed-Assisted Access to Unlicensed Spectrum; (Release 13)", 3GPP Draft, 36889-DOO, 3rd Generation Partnership Project (3GPP), Mobile Competence Centre, 650, Route Des Lucioles, F-06921 Sophia-Antipolis Cedex, France, Jun. 30, 2015 (Jun. 30, 2015), XP050985895.

Alexandre Kanyeshuli, "LTE-in Unlicensed 1-15 Band: Medium Access and Performance Evaluation", May 26, 2015 (May 26, 2015), XP055297560.

European Search Report dated Apr. 26, 2018, issued in European Patent Application No. 16824655.1.

Nokia Networks, 'On DRS Design for LTE LAA', R1-152614, 3GPP TSG-RAN WG1 Meeting #81, Fukuoka, Japan, May 15, 2015.

ZTE, 'On DRS and initial signal in LAA', R1-153015, 3GPP TSG RAN WG1 Meeting #81, Fukuoka, Japan, May 16, 2015.

NTT Docomo, Inc., 'Views on RRM measurement and corresponding DRS design for LAA', R1-153180, 3GPP TSG RAN WG1 Meeting #81, Fukuoka, Japan, May 16, 2015.

3GPP TSG-RAN WG2 Meeting #89bis , Bratislava, Slovakia, Apr. 20-24, 2015, R2-151708.

Chinese Office Action dated Sep. 3, 2020, issued in Chinese Application No. 201510419423.1.

* cited by examiner

METHOD AND EQUIPMENT FOR CHANNEL SENSING AND SIGNAL TRANSMISSION

CROSS-REFERENCE TO RELATED APPLICATION(S)

This application claims the benefit under 35 U.S.C. § 119(a) of a Chinese patent application filed on Jul. 16, 2015 in the Chinese Patent Office and assigned Serial number 201510419423.1, the entire disclosure of which is hereby incorporated by reference.

TECHNICAL FIELD

The present disclosure relates to mobile communication technologies. Particularly, the present disclosure relates to a method and equipment for channel sensing and signal transmission. More particularly, the present disclosure relates to a method and base station for channel sensing and signal transmission, and user equipment (UE) for receiving signals on a carrier in an unlicensed frequency band.

BACKGROUND

The contradiction between the demands of users for high bandwidth radio services and the lack of frequency resources are becoming increasingly acute, and thus mobile operators consider using unlicensed frequency bands as the supplement of licensed frequency bands. Accordingly, the deployment of long term evolution (LTE) in the unlicensed frequency bands is researched initially. The 3rd generation partnership project (3GPP) has begun to researched, under a premise of ensuring that other nodes in unlicensed frequency bands are not impacted, how the spectrum efficiency of whole network is improved through effective carrier aggregation of unlicensed frequency bands and licensed frequency bands.

Usually, an unlicensed frequency band has been assigned for a certain purpose, for example, radar or WiFi of 802.11. Accordingly, interference with the unlicensed frequency band is uncertain, which results in that the quality of service (QoS) of LTE transmission is difficult to be ensured. However, the unlicensed frequency band may still be used to low-QoS data transmission. Herein, a LTE system deployed in the unlicensed frequency band is called a licensed-assisted access (LAA) system. In the unlicensed frequency band, it is an important problem how the interference between the LAA system and another radio system such as the radar or the WiFi is avoided. Clear channel assessment (CCA) is a conflict avoidance mechanism usually used in the unlicensed frequency band. A mobile station (STA) must detect a radio channel before sending signals. The STA cannot occupy the radio channel to send signals unless the STA detects that the radio channel is idle. The LAA system needs to follow a similar mechanism, so as to ensure a small interference with other signals. A simple mechanism includes that a LAA device (a base station or user equipment (UE)) is opened or closed dynamically according to a CCA result. That is, the LAA device sends signals when detecting that the radio channel is idle, and does not send signals when detecting that the radio channel is busy. This mechanism is called listen before talk (LBT).

In a LTE system, channel measurement is very important. For example, radio resource management (RRM) measurement includes reference signal receiving power (RSRP) measurement, reference signal receiving quality (RSRQ) measurement or other measurement reflecting the QoS of carriers, so as to provide reference information for the mobility management of the LTE system. In a LTE system of the related art, the RRM measurement is based on cell specific reference signal (CRS), channel state information-RS (CSI-RS) or discovery signal (DRS). With the evolvement of the LTE system, new reservation signals may be used to implement the above measurement. When the measurement is performed, it is necessary for the UE to obtain identification (ID) information of a cell or obtain at least coarse synchronization information. Accordingly, when performing the RRM measurement, the UE performs channel measurement based on primary synchronization signal (PSS)/secondary synchronization signal (SSS) or other reference signals containing distinguishable cell information, and reference signals that can obtain coarse time/frequency domain synchronization firstly, and then based on the CRS, or the CSI-RS or other reference signals. These reference signals may also provide other information. For example, fine synchronization, CSI measurement and automatic gain control (AGC) reference adjustment may be performed based on the DRS, or the CRS or the CSI-RS. Since the functions of these reference signals are very important for the normal operation of communication system, it is necessary to ensure the normal transmission of these reference signals when designing the transmission mechanism of these reference signals.

In the LAA system, especially in the LAA system based on the LBT, these reference signals cannot be sent in a fixed period all the time. For example, a base station may not pass CCA detection sometimes before DRS measurement timing configuration (DMTC), and thus can only discard the transmission of the DRS in this DMTC. In order to increase the probability of sending the DRS, the duration of the DRS may be shortened, and candidate locations where the DRS is likely to appear may be increased in each DMTC. For example, suppose the duration of the DMTC is 6 ms and the duration of the DRS is 1 ms, the candidate locations where the DRS is likely to appear may be the $i^{th}$ ms in the DMTC, where i=1, 2, 3, 4, 5, 6. In this case, if the CCA detection performed by the base station before any one of the six candidate locations in the DMTC is passed, the base station may send the DRS on the candidate location. In order to ensure the probability of sending the DRS and avoid the impact on other communication systems in the unlicensed frequency band, the LBT mechanism of the DRS may be different from a normal data transmission mechanism. For example, the DRS may adopt a faster LBT mechanism, by which the DRS may be sent through one CCA detection. Data signals may adopt a load based equipment (LBE) mechanism similar to WiFi. For example, the data signals may not be sent unless multiple CCA slots are idle. For the CCA detection adopted when sending the DRS, the base station may find, through simple energy detection, that detected energy is larger than a predefined threshold, and thus determines that a channel detected in this CCA slot is busy and cannot be used for sending the DRS. It should be noted that, the detected energy may be come from signals of other communication systems such as WiFi, or contain signals of the same communication system, for example, the LAA system. In order to avoid impact among LAA systems, especially the impact on the DRS, a new mechanism should be adopted. The new mechanism may be a new transmission mechanism, or a new CCA mechanism.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for channel sensing and signal transmission, so as to improve a frequency domain multiplexing coefficient among nodes adopting the same access technology, and ensure the coexistence of the access technology and others.

In accordance with an aspect of the present disclosure, a method for channel sensing and signal transmission on a cell in an unlicensed frequency band is provided. The method includes performing, by a sending node, channel sensing before sending at least one of data signals and reference signals, determining whether to send the at least one of the data signals and/the reference signals according to a result of the channel sensing, after the determining of whether to send the at least one of the data signals and the reference signals and when sending the at least one of the data signals and the reference signals in a predefined time window, not sending, by the sending node, any signal or sending predefined signals on first time-frequency resources, wherein the first time-frequency resources are at least one of in the time window and immediately adjacent to a beginning of the time window.

The predefined time window is a time window of reference signals that are sent for performing radio resource management (RRM) measurement, or a time window of reference signals that are sent for performing channel state information (CSI) measurement, or a time window of reference signals that are sent for performing synchronization.

The first time-frequency resources appear at least one of periodically or a-periodically in the time window for many times, and are immediately adjacent to the beginning of the time window.

In a time dimension, each first time-frequency resources occupy X orthogonal frequency division multiplexing (OFDM) symbols, and in frequency dimension, each first time-frequency resources contain all sub-carriers, all sub-carriers in a system bandwidth, or all sub-carriers in a predefined bandwidth.

The sending node does not send any signal on the first time-frequency resources, wherein X is a positive real number.

The first time-frequency resources appear at least one of periodically or a-periodically in the time window for many times, and are immediately adjacent to the beginning of the time window.

In a time dimension, each first time-frequency resources occupy X OFDM symbols, and in frequency dimension, each first time-frequency resources contain part of sub-carriers in a system bandwidth or a predefined bandwidth.

The sending node does not send any signal on the first time-frequency resources, wherein X is a positive real number.

The first time-frequency resources appear at least one of periodically or a-periodically in the time window for many times, and are immediately adjacent to the beginning of the time window.

In a time dimension, each first time-frequency resources occupy X OFDM symbols, and in a frequency dimension, each first time-frequency resources contain all or part of sub-carriers in a system bandwidth or a predefined bandwidth.

The sending node sends predefined signals on the first time-frequency resources, wherein X is a positive real number.

The time window is a discovery signal (DRS) measurement timing configuration (DMTC) window, and the first time-frequency resources are at least one of X OFDM symbols at the beginning or end of a possible location of a DRS that appears in the DMTC time window periodically, and located prior to the beginning of the first possible location of the DRS that is immediately adjacent to the beginning of the DMTC time window.

If the sending node sends the data signals and the reference signals in the time window or sends the data signals in the time window, a process that the sending node does not send any signal on the first time-frequency resources includes avoiding, by the sending node, mapping the sent data signals and reference signals or the sent data signals to the first time-frequency resources through rate matching or puncturing.

The first time-frequency resources are located in the DMTC time window and are not prior to the beginning of resources for sending the DRS by the sending node.

If the first time-frequency resources are located at the end of a subframe, the last subframe in the DMTC time window does not contain the first time-frequency resources.

If the first time-frequency resources and the location of a reference signal of the related art overlap, the reference signal of the related art is sent on other resources other than the first time-frequency resources.

If only the reference signals are sent in the time window and the reference signals are reference signals in the DRS, all or part of resources located between the last OFDM symbol of the last possible location of the DRS and the first OFDM symbol of the next possible location of the DRS are the first time-frequency resources.

A method for sending the reference signals includes the following.

Sending the reference signals in the DRS on the location of resources of the related art, wherein the location of the first time-frequency resources is not filled when padding signals are sent, and if a subframe where the first time-frequency resources are located supports a sending mode based on a demodulation reference signal (DM-RS), mapping the DM-RS to the location of resources other than the first time-frequency resources.

Sending the reference signals in the DRS according to a new mapping mode, and reserving at least X1 OFDM symbols between the last OFDM symbol of the reference signals in the DRS and the first OFDM symbol at the next location of the DRS.

When the channel sensing is performed in the time window, the channel sensing includes performing type 2 channel sensing on second time-frequency resources in the time window.

The second time-frequency resources are a subset or universal set of the first time-frequency resources, or the second time-frequency resources and the first time-frequency resources intersect partially.

The second time-frequency resources appear periodically or a-periodically in the time window for many times.

Performing the type 2 channel sensing on the second time-frequency resources includes the following.

Performing initial clear channel assessment (CCA) detection on each second time-frequency resources, if the initial CCA detection is passed, sending the at least one of the data signals and the reference signals on other resources except the first time-frequency resources until the next second time-frequency resources, otherwise, not sending the at least one of the data signals and the reference signals until the next second time-frequency resources.

The second time-frequency resources appear periodically or a-periodically in the time window for many times.

Performing the type 2 channel sensing on the second time-frequency resources includes the following.

Performing initial CCA detection on each second time-frequency resources, if the initial CCA detection is passed, sending the at least one of the data signals and the reference signals on other resources except the first time-frequency resources until the next second time-frequency resources, otherwise, performing enhanced CCA (eCCA) detection, if the eCCA detection is passed before at least one of the beginning of the next second time-frequency resources and the beginning of predefined partial subframes, sending the at least one of the data signals and the reference signals on other resources except the first time-frequency resources until the next second time-frequency resources, if the eCCA detection is not passed before the beginning of the next second time-frequency resources, not sending the at least one of the data signals and the reference signals until the next second time-frequency resources.

The second time-frequency resources appear periodically or a-periodically in the time window for many times.

Performing the type 2 channel sensing on the second time-frequency resources includes the following.

Performing initial CCA detection on each second time-frequency resources, if the initial CCA detection is passed, sending the at least one of the data signals and the reference signals on other resources except the first time-frequency resources until the next second time-frequency resources, otherwise, performing eCCA detection, if the eCCA detection is passed before the beginning of the next second time-frequency resources, sending the at least one of the data signals and the reference signals on other resources except the first time-frequency resources until the next second time-frequency resources, and performing the initial CCA detection, if the eCCA detection is not passed before the beginning of the next second time-frequency resources, not sending the at least one of the data signals and the reference signals until the next second time-frequency resources, and continuing the eCCA detection.

The second time-frequency resources appear periodically or a-periodically in the time window for many times.

Performing the type 2 channel sensing on the second time-frequency resources includes the following.

When the sending node is in an idle state, performing initial CCA detection on current second time-frequency resources, if the initial CCA detection is passed, sending the at least one of the data signals and the reference signals on other resources except the first time-frequency resources until the next second time-frequency resources, and performing the initial CCA detection, otherwise, performing eCCA detection, if the eCCA detection is passed before the beginning of the next second time-frequency resources, sending the at least one of the data signals and the reference signals on other resources except the first time-frequency resources until the next second time-frequency resources, and performing the initial CCA detection, if the eCCA detection is not passed before the beginning of the next second time-frequency resources, not sending the at least one of the data signals and the reference signals until the next second time-frequency resources, continuing the eCCA detection or performing the eCCA detection again.

When the sending node is not in an idle state, performing eCCA detection on each second time-frequency resources, if the eCCA detection is passed, sending the at least one of the data signals and the reference signals on other resources except the first time-frequency resources until the next second time-frequency resources, and performing the eCCA detection again, otherwise, not sending the at least one of the data signals and the reference signals until the next second time-frequency resources, and continuing the eCCA detection or performing the eCCA detection again.

The second time-frequency resources appear periodically or a-periodically in the time window for many times, and signals are directly sent on other resources except the first time-frequency resources without performing initial CCA detection on the second time-frequency resources.

The eCCA detection is performed by adopting zero defer, or adopting a defer shorter than or equal to slot length of channel sensing performed outside the time window.

The length of an initial CCA detection slot in the type 2 channel sensing is larger than, smaller than or equal to the length of an initial CCA detection slot in the type 2 channel sensing performed outside the time window.

Data transmission before the last first time-frequency resources in the time window is determined whether to be performed according to a channel sensing result of the type 2 channel sensing.

The type 2 channel sensing is performed when there is data to be sent in the time window.

In a scenario that a channel has been occupied before the time window through channel sensing to send signals, performing the type 2 channel sensing in the time window, if the channel has not been occupied before the time window through channel sensing and the sending node has data to be sent but has no DRS to be sent, performing the type 1 channel sensing in the time window, or performing the type 2 channel sensing in the time window.

In a scenario that the channel has been occupied before the time window through channel sensing, a scenario that the channel has not been occupied before the time window through channel sensing, and a scenario that the duration of occupying the channel through the type 2 channel sensing exceeds a defined threshold, modes for performing the type 2 channel sensing in the time windows are the same or different.

When data is not sent but the DRS is sent and the channel sensing is performed in the time window, the channel sensing includes the following.

Performing, by the sending node, type 3 channel sensing on third time-frequency resources, and determining whether to send the DRS in the time window according to a channel sensing result, the third time-frequency resources and the first time-frequency resources overlap, and the type 3 channel sensing is energy detection or sequence detection in time domain or in frequency domain.

The first time-frequency resources appear at least one of periodically or a-periodically in the time window for many times, and immediately adjacent to the beginning of the time window.

On time dimension, each first time-frequency resources occupy X OFDM symbols, and on frequency dimension, each first time-frequency resources contain all sub-carriers, or all sub-carriers in a system bandwidth or all sub-carriers in a predefined bandwidth.

The sending node does not send any signal on the first time-frequency resources, wherein X is a positive real number.

The channel sensing performed by the sending node on the third time-frequency resources is the energy detection in time domain.

The first time-frequency resources appear at least one of periodically or a-periodically in the time window for many times, and immediately adjacent to the beginning of the time window.

In a time dimension, each first time-frequency resources occupy X OFDM symbols, and in a frequency dimension, each first time-frequency resources contain part of sub-carriers in a system bandwidth or a predefined bandwidth.

The sending node does not send any signal on the first time-frequency resources, wherein X is a positive real number.

The channel sensing performed by the sending node on the third time-frequency resources is the energy detection in frequency domain.

The first time-frequency resources appear at least one of periodically or a-periodically in the time window for many times, and immediately adjacent to the beginning of the time window.

In a time dimension, each first time-frequency resources occupy X OFDM symbols, and in a frequency dimension, each first time-frequency resources contain all or part of sub-carriers in a system bandwidth or a predefined bandwidth.

The sending node sends predefined signals on the first time-frequency resources, wherein X is a positive real number.

The channel sensing performed by the sending node on the third time-frequency resources is the sequence detection in time domain or in frequency domain.

The third time-frequency resources appear periodically in the time window.

After performing the type 3 channel sensing every time, if the type 3 channel sensing is passed, the sending node sends the DRS at the closest sending location of the DRS, otherwise, when there is no data to be sent, performing the type 3 channel sensing on the next third time-frequency resources.

If the type 3 channel sensing is passed on the first time-frequency resources, the sending node does not send signals or sends predefined signals on the first time-frequency resources until the closest sending location of the DRS, and sends the DRS, or the sending node sends reservation signals on the first time-frequency resources until the closest sending location of the DRS, and sends the DRS.

An equipment for channel sensing and signal transmission on a cell in an unlicensed frequency band includes a channel sensing unit and a signal sending unit.

The channel sensing unit is configured to perform channel sensing before sending at least one of data signals and reference signals, and determine whether to send the at least one of the data signals and the reference signals according to a channel sensing result.

The signal sending unit is configured to send signals when the channel sensing unit determines to send at least one of the data signals and the reference signals, and when sending the at least one of the data signals and the reference signals in a predefined time window, not to send signals or send predefined signals on first time-frequency resources.

The first time-frequency resources being in at least one of the time window and immediately adjacent to the beginning of the time window.

As can be seen from the above solution of the present disclosure, because signals are not sent or only predefined signals are sent on some reserved resources, channel sensing resources for sending reference signals may be reserved for other sending nodes, thereby avoiding that a base stations of the licensed-assisted access (LAA) system hinders another base station from using the unlicensed frequency band, improving the frequency domain multiplexing coefficient among nodes adopting the same access technology, and ensuring the coexistence of the access technology and others.

Further, through setting the type 2 channel sensing on the second time-frequency resources, the length of listen before talk (LBT) may be shortened when the data signals and the reference signals are sent, thereby rapidly sending the reference signals. In addition, through setting the type 3 channel sensing on the third time-frequency resources, the impact among the channel sensing of different base stations of the LAA system can be avoided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
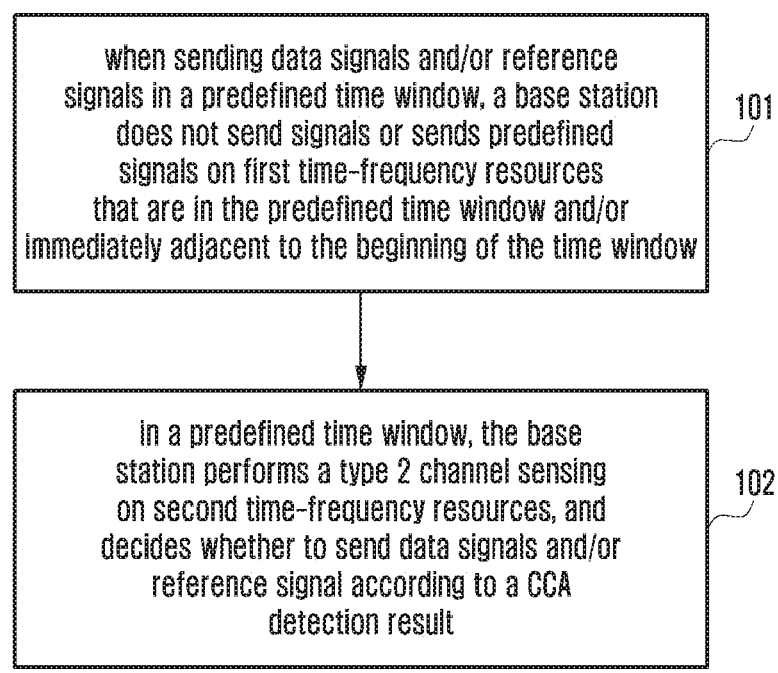
FIG. 1 is a flowchart illustrating a method for channel sensing and signal transmission according to a first embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Considering the problems mentioned in the background, the present disclosure provides a new method for channel sensing and signal transmission. Through proper signal transmission and/or enhanced clear channel assessment (CCA) procedure, reference signals can be sent effectively in limited resources, and it can be avoided that data signals being sent impact the reference signals to be transmitted, or it can be avoided that reference signals being sent impact the reference signals to be transmitted. In the present disclosure, it is determined through channel sensing whether data signals and/or reference signals are to be sent. After determining that the data signals and/or the reference signal are to be sent, a sending node reserves time-frequency resources when sending signals in a time window in which the reference signals are sent. These reserved time-frequency resources are not used for sending data signals and/or reference signals of a cell, but are used for performing channel sensing for reference signals such as a discovery signal (DRS) by other nodes. Accordingly, it can be avoided that a base stations of the licensed-assisted access (LAA) system hinders another base station from using an unlicensed frequency band. The reserved time-frequency resources are called first time-frequency resources. Further, if the CCA detection of the cell is performed before the data signals and/or the reference signals are sent in the time window in which the reference signals are sent, the CCA detection of the cell may be performed outside the time window or in the time window. The CCA detection of the cell performed in the time window may be performed on second time-frequency resources, or may be performed on third time-frequency resources when only the reference signals are sent but the data are not sent, e.g., the transmission including the DRS but not including a physical downlink shared channel (PDSCH). The implementations of the present disclosure will be illustrated hereinafter with reference to embodiments.

A first embodiment is implemented as follows.

The first embodiment describes signal processing on the first time-frequency resources and channel sensing processing on the second time-frequency resources.

FIG. 1 is a flowchart illustrating a method for channel sensing and signal transmission according to an embodiment of the present disclosure.

Figure 2A:
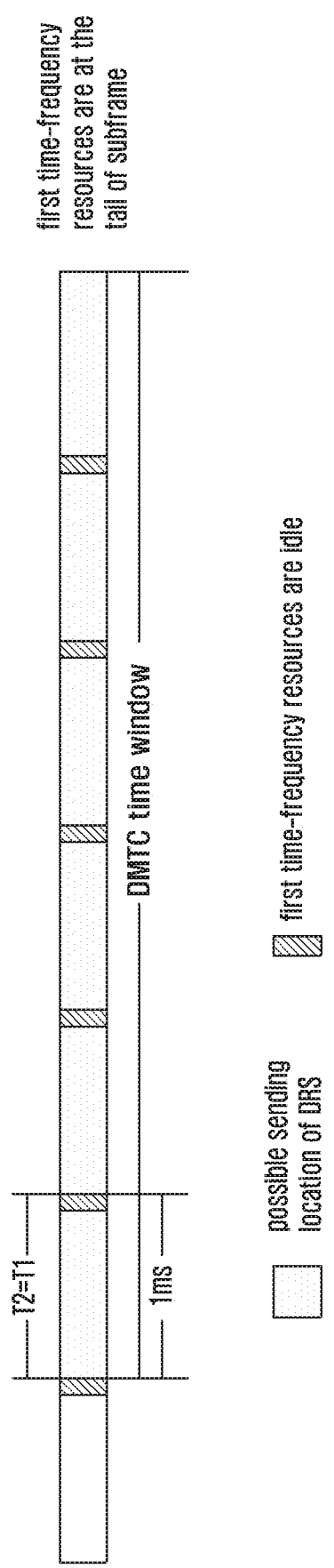
FIGS. 2A and 2B are diagrams illustrating first time-frequency resources according to various embodiments of the present disclosure.
Figure 2B:
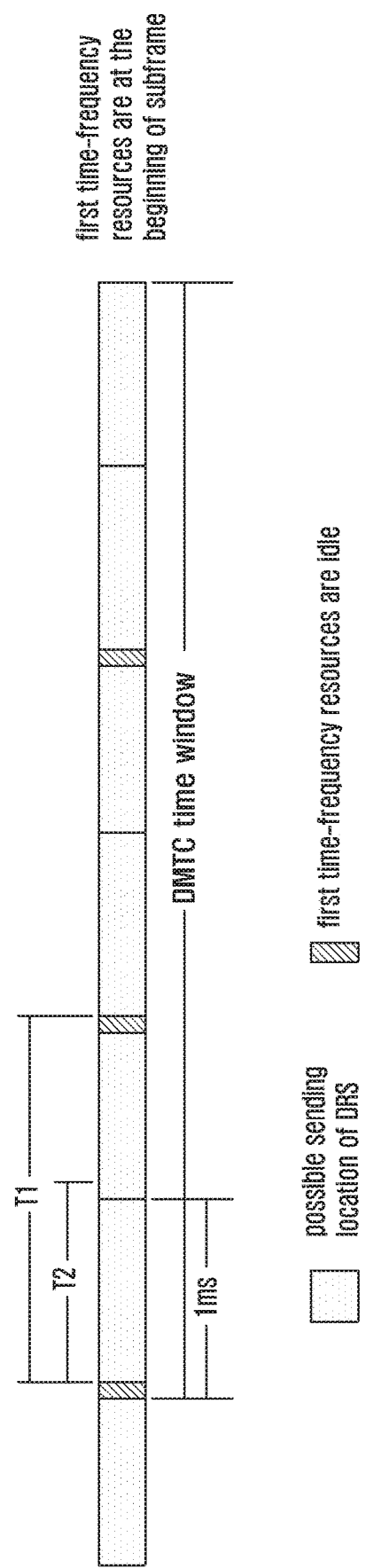

FIGS. 2A and 2B are diagrams illustrating a method for channel sensing and signal transmission according to the first embodiment of the present disclosure.

Referring to FIGS. 2A and 2B, the method includes following blocks.

At block 101, when sending data signals and/or reference signals in a predefined time window, a sending node does not send signals or sends predefined signals on first time-frequency resources that are in the predefined time window and/or immediately adjacent to the beginning of the time window.

At actual applications, before sending the data signals and/or the reference signals, channel sensing should be performed firstly, and then it is determined according to a channel sensing result whether the data signals and/or the reference signals are to be sent. For consecutive subframes of the data signals and/or the reference signals performed in the time window, the channel sensing may occur before the time window or occur in the time window. The new channel sensing method provided by the present disclosure is mainly used for the channel sensing in the time window or just right before the time window, for example, block 102 of the first embodiment. The channel sensing performed before the time window is not described in the first embodiment.

Preferably, the sending node may be a base station or user equipment (UE). Hereinafter, all embodiments are described by taking the base station as an example.

Preferably, the first time-frequency resources, a receiving node and the sending node are well known. For example, the sending node is a base station, and the receiving node is UE or another base station.

The data signals may contain PDSCH, physical downlink control channel (PDCCH), enhanced PDCCH (EPDCCH) or other newly defined control signals. The reference signals may be one or more reference signals of the related art in the long term evolution (LTE) system, or may be other newly defined reference signals with specific functions.

Preferably, the predefined time window may be a time window of reference signals sent for performing radio resource management (RRM) measurement, for example, DRS measurement timing configuration (DMTC). As mentioned above, the reference signals for performing RRM measurement (DRS) may also have a cell distinguishing function, may have a function providing coarse time synchronization and/or fine time synchronization and/or frequency domain synchronization, may have an automatic gain control (AGC) reference adjustment function and may have a channel state information (CSI) measurement function.

Preferably, the predefined time window is a time window of reference signals sent for performing CSI measurement.

Preferably, the predefined time window is a time window of reference signals for performing synchronization.

The time window may appear periodically. For example, the duration of the DMTC is called DMTC duration, and the time location of a DMTC time window is determined by a DMTC period called DMTC-periodicity and DMTC offset called DMTC-offset. The following embodiments are described by taking the DMTC time window as an example. Other time windows are similar to the DMTC time window.

The first time-frequency resources may appear in the time window periodically or a-periodically for a plurality of times. For example, in the time window, time resources may be divided into $N_1$ parts, and each part may be divided into $M_1$ sub-resources. One part of the $M_1$ sub-resources is used to send usable signals, for example, send data signals, or send data signals and a DRS, or send the DRS, and the other part of the $M_1$ sub-resources are the first time-frequency resources. It should be noted that, the $N_1$ parts may have the same length or have different lengths. Similarly, the $M_1$ sub-resources may have the same length or have different lengths. According to the occupation mode of the first time-frequency resources on time dimension, the first time-frequency resources may appear in the time window for a plurality of times. The first time-frequency resources may appear periodically (for example, when the $N_1$ parts have the same length and the $M_1$ sub-resources also have the same length) or appear a-periodically for a plurality of times. The definition and processing for the first time-frequency resources may be always the same no matter whether the first time-frequency resources appear periodically or a-periodically. The definition of the first time-frequency resources and processing for signals on the first time-frequency resources will be described hereinafter by taking an example that the first time-frequency resources appear periodically.

The first time-frequency resources may be defined through three definition modes.

In a first definition mode, the first time-frequency resources appear in a period T1 in the time window, and/or appear at a location immediately adjacent to the beginning of the time window. The first time-frequency resources occupy X orthogonal frequency division multiplexing (OFDM) symbols on time dimension, where X is an integer (for example, X=1) or a fraction. The first time-frequency resources contain all sub-carriers or contain all sub-carriers in a predefined bandwidth on frequency dimension. On these time-frequency resources, the base station does not send any signal.

In the first definition mode, preferably, suppose there are multiple possible locations of the DRS in the DMTC time window and an interval between the beginnings of two possible locations of the DRS is T2, the period T1 of the first time-frequency resources is equal to N*T2, where N is an integer, and the offset of the first time-frequency resources relative to the DRS is Δ on time dimension. The first time-frequency resources occupy X OFDM symbols on time dimension, where X is an integer (for example, X=1) or a fraction. Accordingly, the length of time occupied by the first time-frequency resources is equal to the length of M channel sensing slots for sending the DRS, where M is a positive integer, for example, M=1.

Referring to FIGS. 2A and 2B, the duration of the DRS is 1 ms, and the length of the DMTC time window is 6 ms. Suppose the DRS have 6 possible locations, where the beginnings of the possible locations i=1, 2, 3, 4, 5, 6 ms, i.e., the $1^{th}$~$6^{th}$ ms in the DMTC time window, the period of the first time-frequency resources is 1 ms. The offset Δ is set to make the first time-frequency resources be X=1 OFDM symbol at the $i^{th}$ ms beginning or end in the DMTC time window. For simplification, time and frequency resources are called time-frequency resources for short in the drawings of the present disclosure. Referring to FIG. 2A, the DMTC time window is divided into $N_1$=6 parts of time resources, and the length of each part of time resources is 1 ms. Each part of time resources is divided into $M_1$=2 parts of sub-resources. One part of sub-resources is used for sending usable signals, for example, sending the DRS, and the other part of sub-resources is the first time-frequency resources. N=1 and T1=T2, that is, for each possible DRS transmission, there is the first time-frequency resources, and the first time-frequency resources are located at the last OFDM symbol of the $1^{th}$~$5^{th}$ sub-frames in the DMTC time window and at the last OFDM symbol of a sub-frame before the beginning of the DMTC time window. Referring to FIG. 2B, the DMTC time window is divided into $N_1$=3 parts of time resources, and the length of each part of time resources is 2 ms. Each part of time resources are divided into $M_1$=2 parts of sub-resources. One part of sub-resources is used for sending usable signals, and the other part of sub-resources is the first time-frequency resources. N=2 and T1=2T2, that is, for each two possible DRS transmissions, there is the first time-frequency resources, and the first time-frequency resources are located at the first OFDM symbol of the $1^{th}$, $3^{th}$ and $5^{th}$ sub-frames in the DMTC time window. In the first definition mode, an implementation that signals are not sent on the first time-frequency resources will be described hereinafter.

Figure 3A:
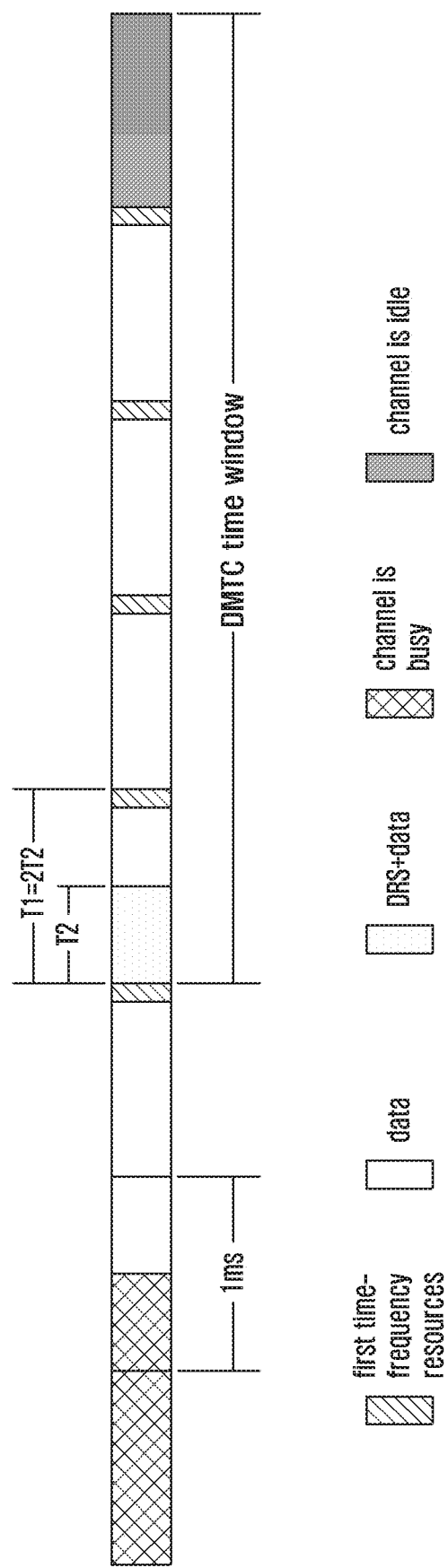
FIGS. 3A, 3B, and 3C are diagrams illustrating data signals and first time-frequency resources when the data signals have been sent before a discovery signal (DRS) measurement timing configuration (DMTC) time window according to various embodiments of the present disclosure.
Figure 3B:
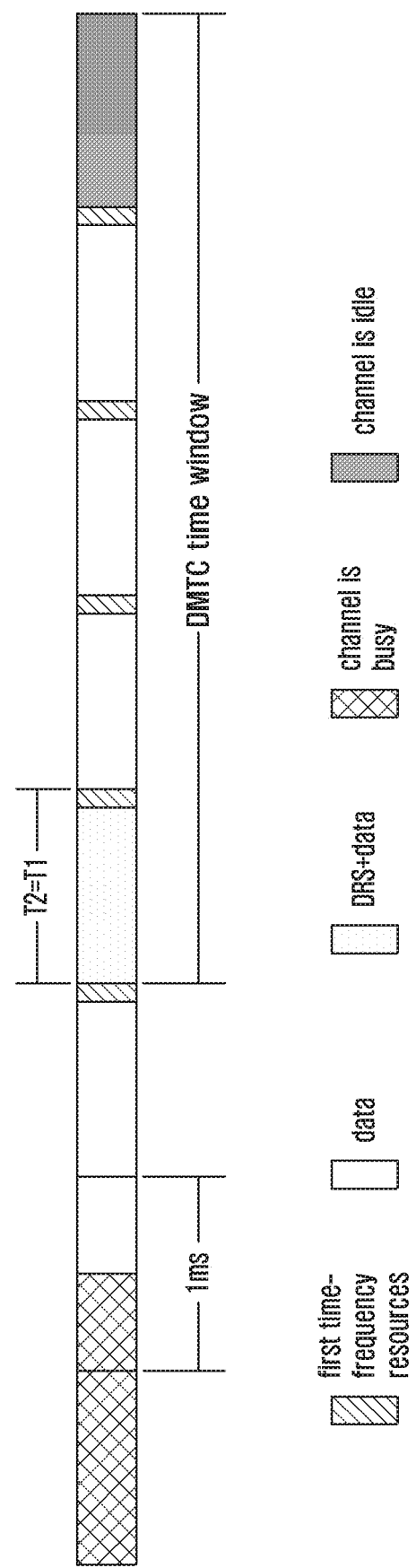
Figure 3C:
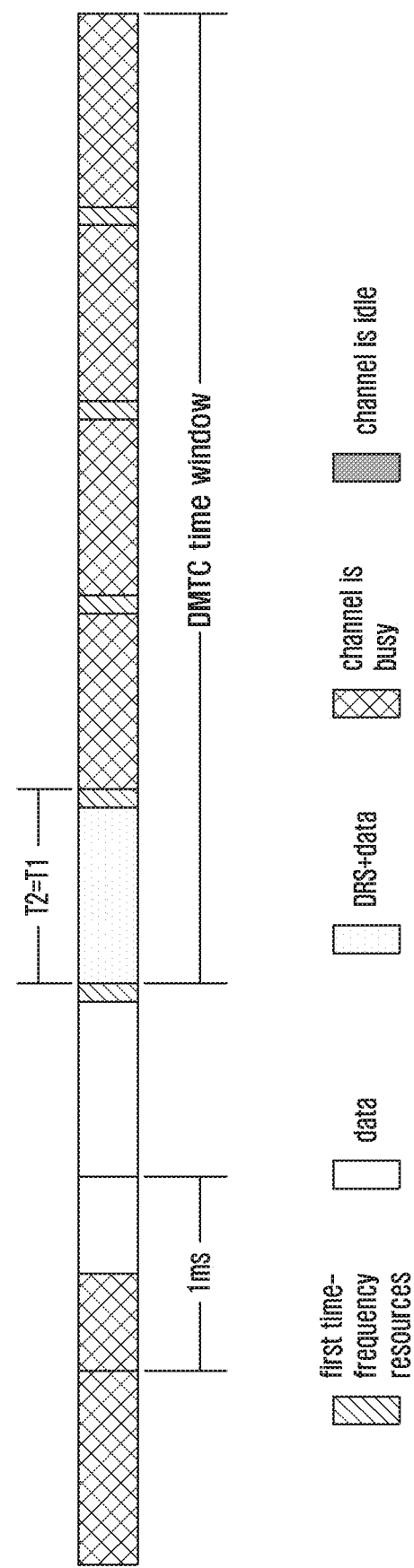

FIGS. 3A, 3B, and 3C are diagrams illustrating data signals and first time-frequency resources when the data signals have been sent before a DMTC time window according to various embodiments of the present disclosure.

(1) If the base station is sending data signals and reference signals or is sending data signals, the base station does not send any signal on the first time-frequency resources, and may avoid mapping the data signals and/or reference signals to the first time-frequency resources through rate matching or puncturing. Referring to FIGS. 3A and 3B, if the duration of the DRS is T2=0.5 ms or T2=1 ms and the period of the first time-frequency resources is T1=1 ms, the base station excludes the last OFDM symbol of a subframe immediately adjacent to the beginning of the DMTC time window and the last OFDM symbol of 5 subframes in the DMTC time window when mapping the data signals to physical resources. After the first time-frequency resources, the base station may send the data signals and/or reference signals again. It should be noted that a channel may be occupied by another communication node. Referring to FIG. 3C, after the last OFDM symbol of the first subframe in the DMTC time window becomes idle, the channel is occupied by another communication node, for example, resources from the second subframe to the last subframe in the DMTC time window are all occupied. In this case, if the base station does not perform listen before talk (LBT) but continues sending the data signals and/or reference signals, collision will occur. If the base station performs LBT, the base station cannot continue sending the data signals and/or reference signals until the channel becomes idle. How the base station performs LBT will be described at block 102.

Figure 4A:
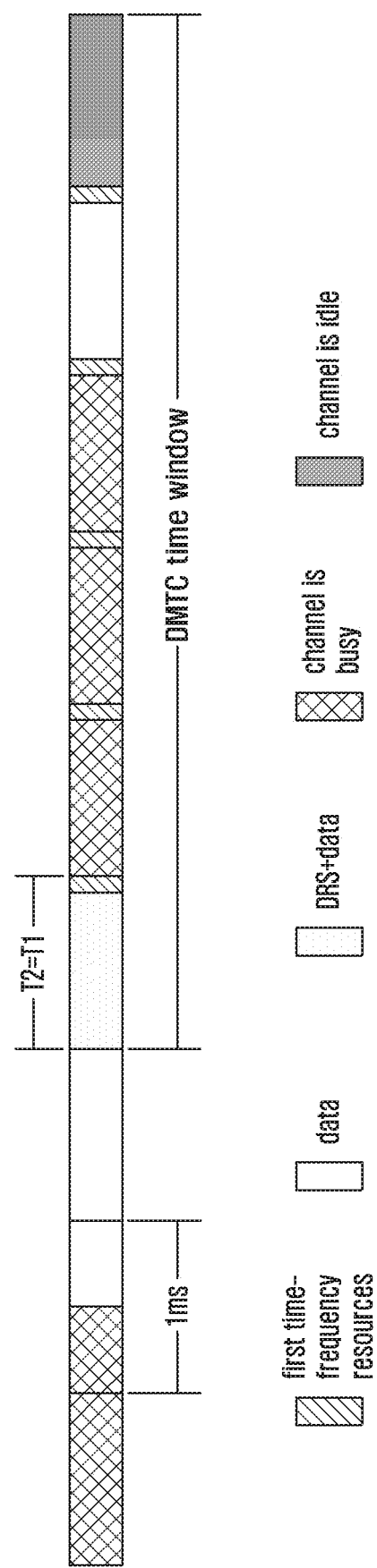
FIGS. 4A, 4B, and 4C are diagrams illustrating first time-frequency resources only located in a DMTC time window according to various embodiments of the present disclosure.
Figure 4B:
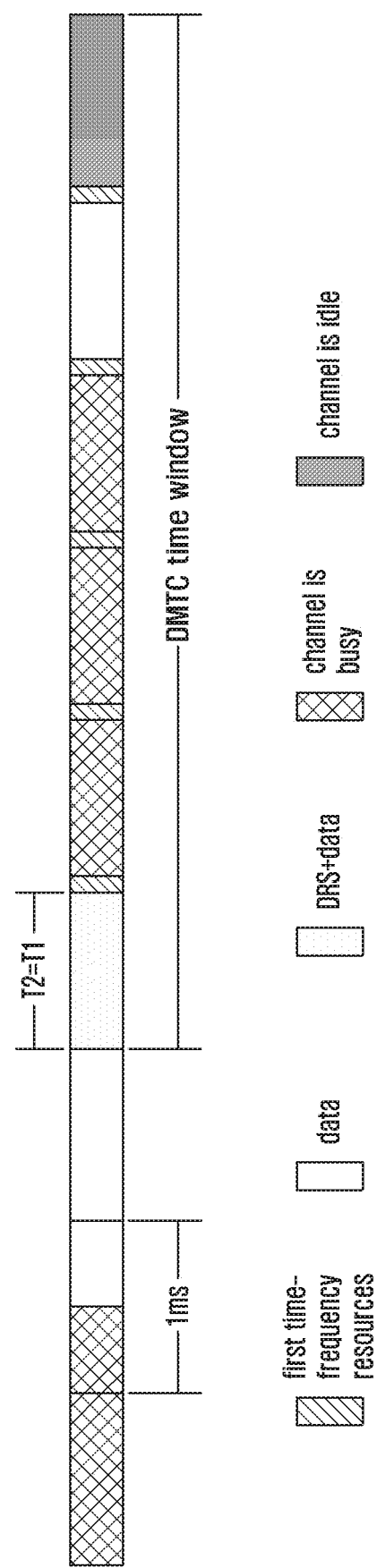
Figure 4C:
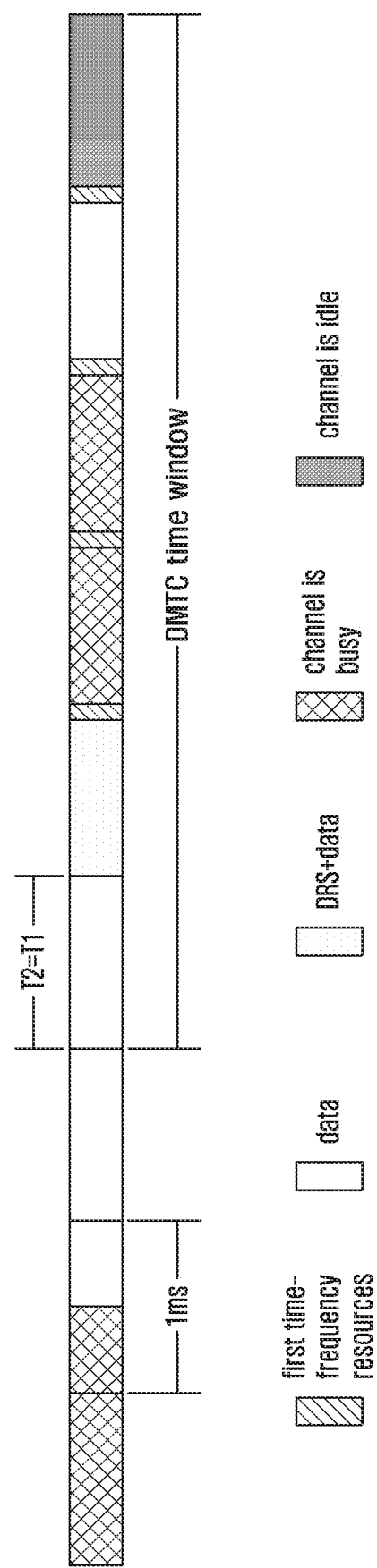

Preferably, in order to avoid that the base station being sending data signals cannot grab a channel for sending the DRS again in time after the first time-frequency resources, the first time-frequency resources of the base station do not contain a subframe located before resources for sending the DRS by the base station in the same burst. That is, the first time-frequency resources of the base station is in the DMTC time window and is not prior to the beginning of the resources for sending the DRS by the base station. For example, if the base station sends the DRS in the first subframe in the DMTC time window, the first time-frequency resources do not contain the subframe immediately adjacent to the beginning of the DMTC time window. That is, the first time-frequency resources are only in the DMTC time window, as shown in FIGS. 4A and 4B. FIG. 4C shows an example that the DRS is located in the second subframe in the DMTC time window.

FIGS. 4A, 4B, and 4C are diagrams illustrating first time-frequency resources only located in a DMTC time window according to various embodiments of the present disclosure.

Preferably, if the first time-frequency resources are located at the end of a subframe, the last subframe in the DMTC time window does not contain the first time-frequency resources. For example, if there are 6 subframes in the DMTC time window, the first time-frequency resources are only in the $1^{th}$~$5^{th}$ subframes.

Figure 6:
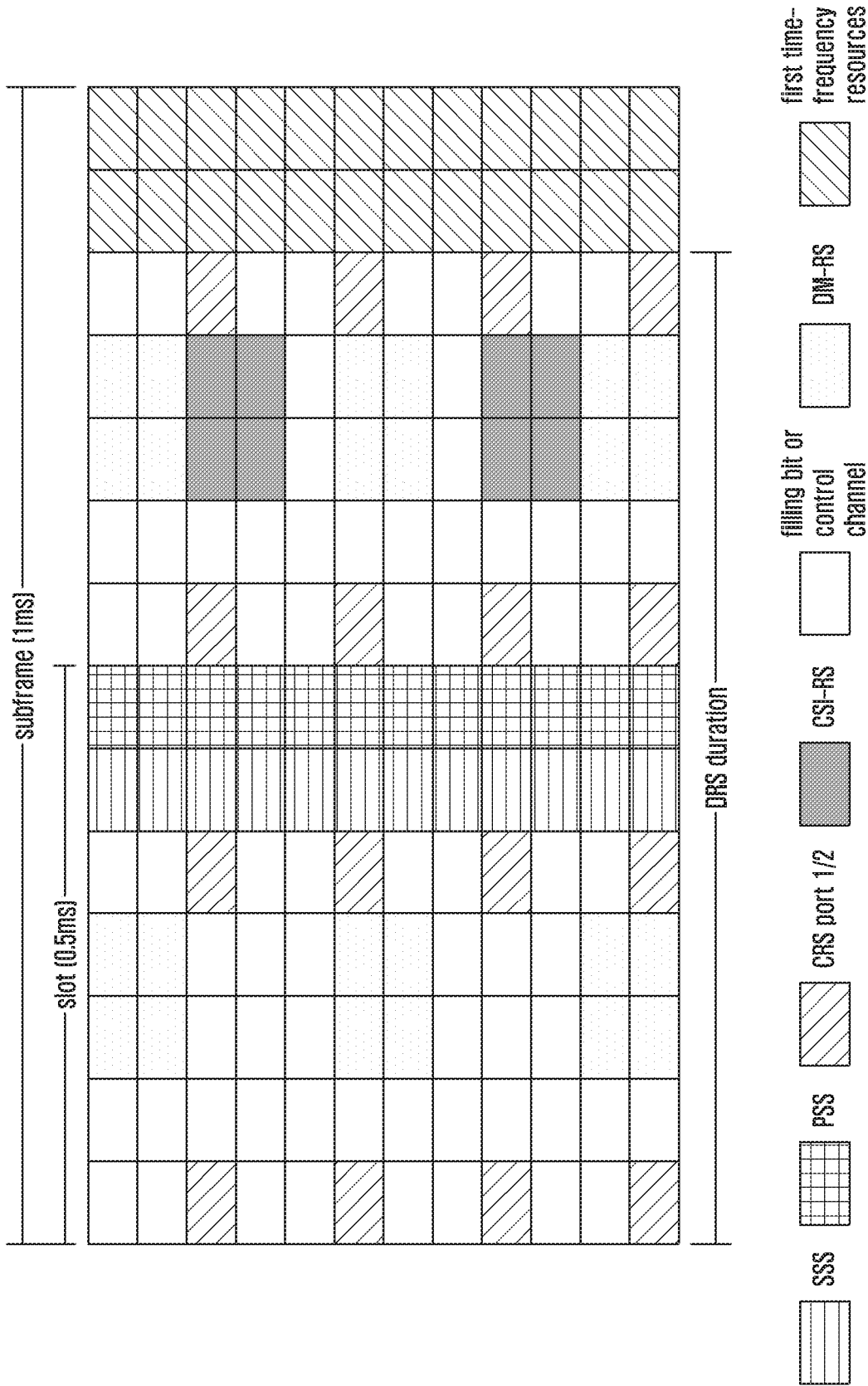
FIG. 6 is a diagram illustrating mapping of demodulation reference signal (DM-RS) according to an embodiment of the present disclosure.

Preferably, if the first time-frequency resources and the location of a demodulation (DM)-reference signal (RS) of the related art overlap, the location of the DM-RS needs to be reset, referring to the description at (2) and FIG. 6. Similarly, if the first time-frequency resources and the location of another RS of the related art overlap, the location of the RS needs to be reset.

(2) If the base station is sending reference signals but does not send data signals, especially, if the base station is sending the DRS, for example the base station transmits a transmission including the DRS but not including the PDSCH, the base station maps the DRS and other padding signals or control signals transmitted together with DRS on the resources, which are not part of the first time-frequency resources. Herein, the transmission of the reference signals is mainly discussed, and for reservation signals that are sent before sending the reference signals and used for occupying a channel or providing other functions, it may map on the first time-frequency resources or may not. In one case, the base station has grabbed the channel through CCA detection before the end of the first time-frequency resources. In this case, the base station may immediately send signals after the base station finishes the CCA detection, for example, transmit reservation signals to hold the channel, and begins to send the DRS until the nearest location for sending the DRS. In this case, the reservation signals are sent in the part of the first time-frequency resources. The reservation signals may not be distinguished by other base stations. In this way, the reservation signals before the DRS transmitted on the first time-frequency resources from the base station A may interfere with the CCA detection performed by the base station B. Because the base station B is unable to distinguish the base station A, thereby resulting in that the base station B deems that the channel is busy when performing CCA detection. However, an advantage lies in that the priority of the base station A only sending the DRS can be ensured because the transmission of the DRS is more important than the transmission of the data signals. In another case, the base station may grab the channel through CCA detection before the end of first time-frequency resources, but needs to wait until the end of the first time-frequency resources when sending the reservation signals, or sends signals that can be distinguished by other base stations on corresponding resources, to avoid the impact on other base stations sending data signals.

Specifically, the base station is sending the reference signals, and following implementation modes may be adopted.

Figure 5:
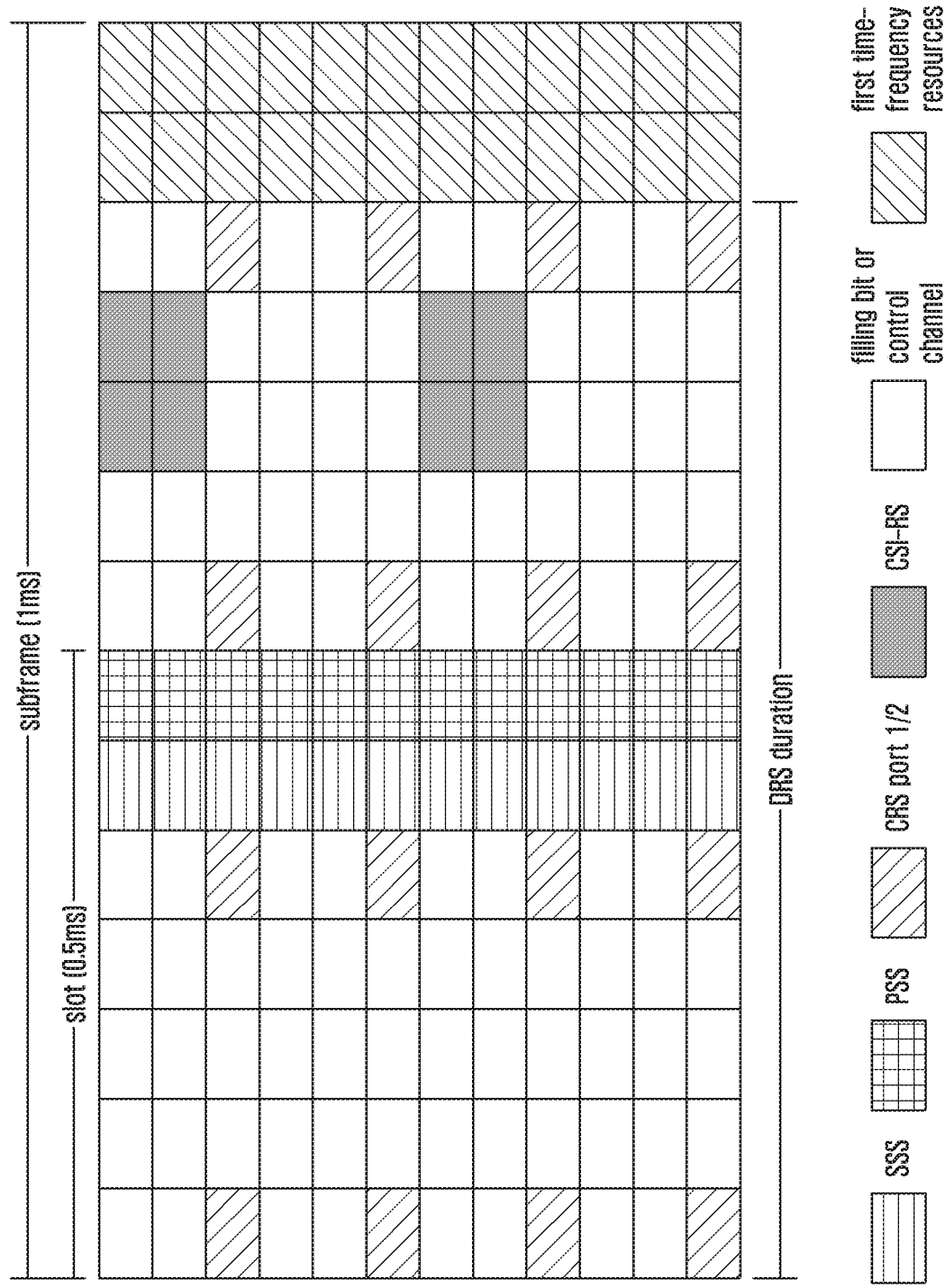
FIG. 5 is a diagram illustrating first time-frequency resources and DRS duration that has been shortened to 12 orthogonal frequency division multiplexing (OFDM) signals according to an embodiment of the present disclosure.

FIG. 5 is a diagram illustrating first time-frequency resources and DRS duration that has been shortened to 12 OFDM signals according to an embodiment of the present disclosure.

In an implementation mode, the mapping of reference signals in the DRS such as primary synchronization signal (PSS)/secondary synchronization signal (SSS)/cell specific reference signal (CRS)/CSI-RS still adopts the location of the LTE system of the related art, but the padding signals for occupying the channel fill resource location until the last OFDM symbol where all reference signals of the DRS are located. Accordingly, the duration of the DRS may not be 1 subframe, but is shortened to 12 OFDM symbols, as shown in FIG. 5. The PSS is in the last OFDM symbol of the $1^{st}$ slot in the DRS duration, and the SSS is in the penultimate OFDM symbol of the $1^{st}$ slot in the DRS duration. The CRS is in the first and $5^{th}$ OFDM symbol in both slots in the DRS duration, and the CSI-RS is in the $10^{th}$ and $11^{th}$ OFDM symbol in the DRS duration if the CSI-RS of the DRS is configured. In this implementation mode, the first time-frequency resources are all or part of resources between the last symbol of the last possible location of the DRS and the first symbol of the next possible location of the DRS, for example, the last two OFDM symbols in the subframe containing the DRS if the DRS duration is only 12 OFDM symbols. If the subframe needs to support a transmission mode based on the DM-RS, the DM-RS may be mapped to other OFDM symbols.

FIG. 6 is a diagram illustrating mapping of DM-RS according to an embodiment of the present disclosure.

Referring to FIG. 6, the DM-RS in the first slot is moved to the third OFDM symbol of the first slot and the DM-RS in the second slot is moved to the fourth OFDM symbol of the second slot, which is the same as the DM-RS pattern of the special subframe configurations 3, 4, 8, 9 of the related art. Of cause, it is feasible that the DM-RS in the second slot is moved to the third and fourth OFDM symbols of the second slot, but the location of the DM-RS in the first slot is kept unchanged. That is, the DM-RS in the first slot occupies the last two OFDM symbols of the first slot in other physical resource blocks (PRBs) which do not contain the PSS/SSS. If the density of partial RSs needs to be increased based on the DRS of the related art, the OFDM symbols where the increased RSs are located are not posterior to the location of the last OFDM symbol where all reference signals of the DRS of the related art are located, as shown in FIG. 7.

Figure 7:
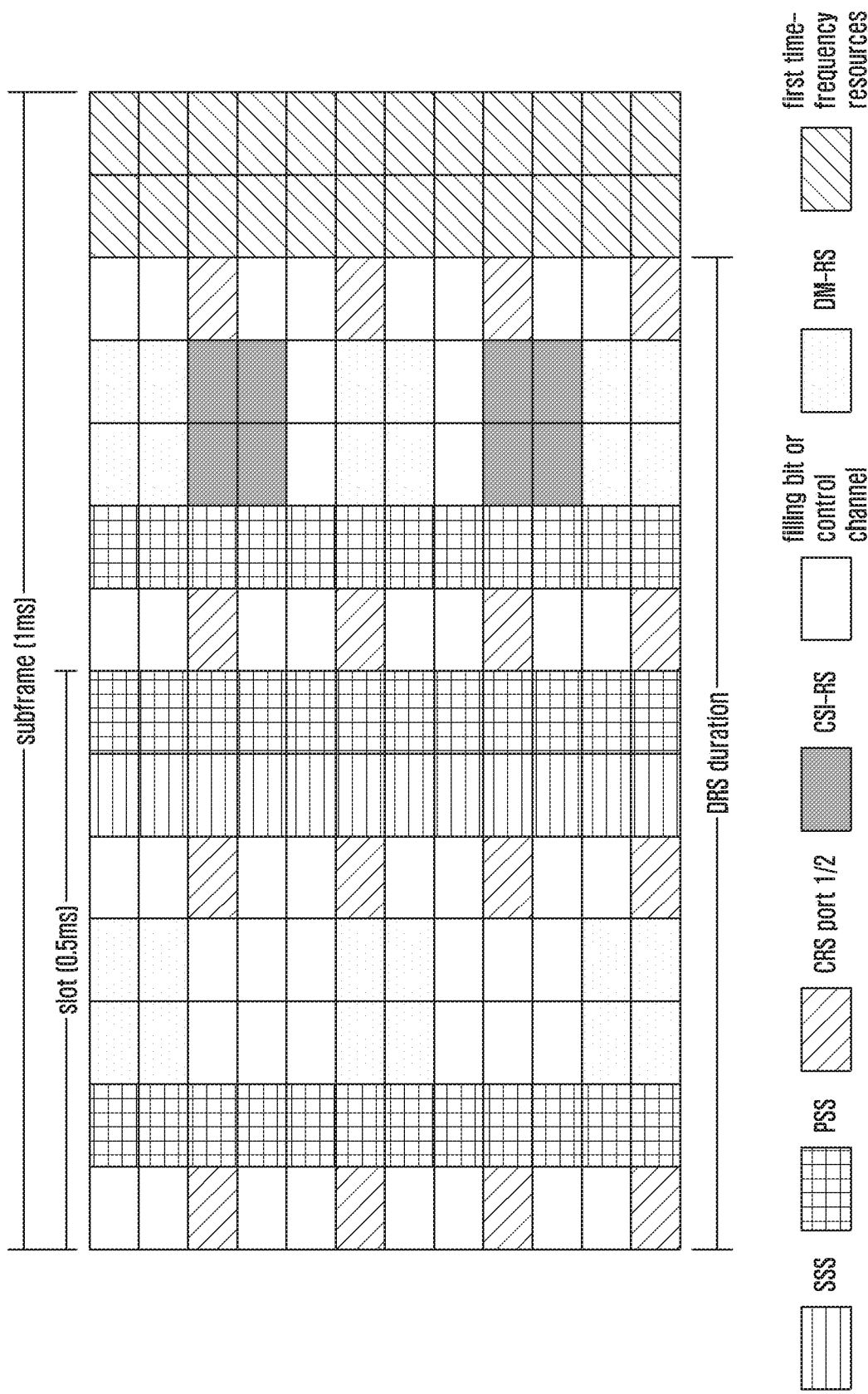
FIG. 7 is a diagram illustrating resource mapping when the density of RS is increased according to an embodiment of the present disclosure.

FIG. 7 is a diagram illustrating resource mapping when the density of RS is increased according to an embodiment of the present disclosure.

It should be noted that, in the above mentioned drawings, the padding signals occupy all time-frequency resources except the reference signals and the first time-frequency resources. However, for convenience of description, the padding signals may only occupy partial resources on the frequency domain as long as the prescript of the unlicensed frequency band is met.

In another implementation mode, if the reference signals in the DRS adopt a new mapping mode, all signals should be centralized as much as possible when being mapped. All or part of resources from the last OFDM symbol of the last location of the DRS to the first OFDM symbol of the next location of the DRS is the first time-frequency resources. On the first time-frequency resources, no signal is sent, as shown in FIG. 8.

Figure 8:
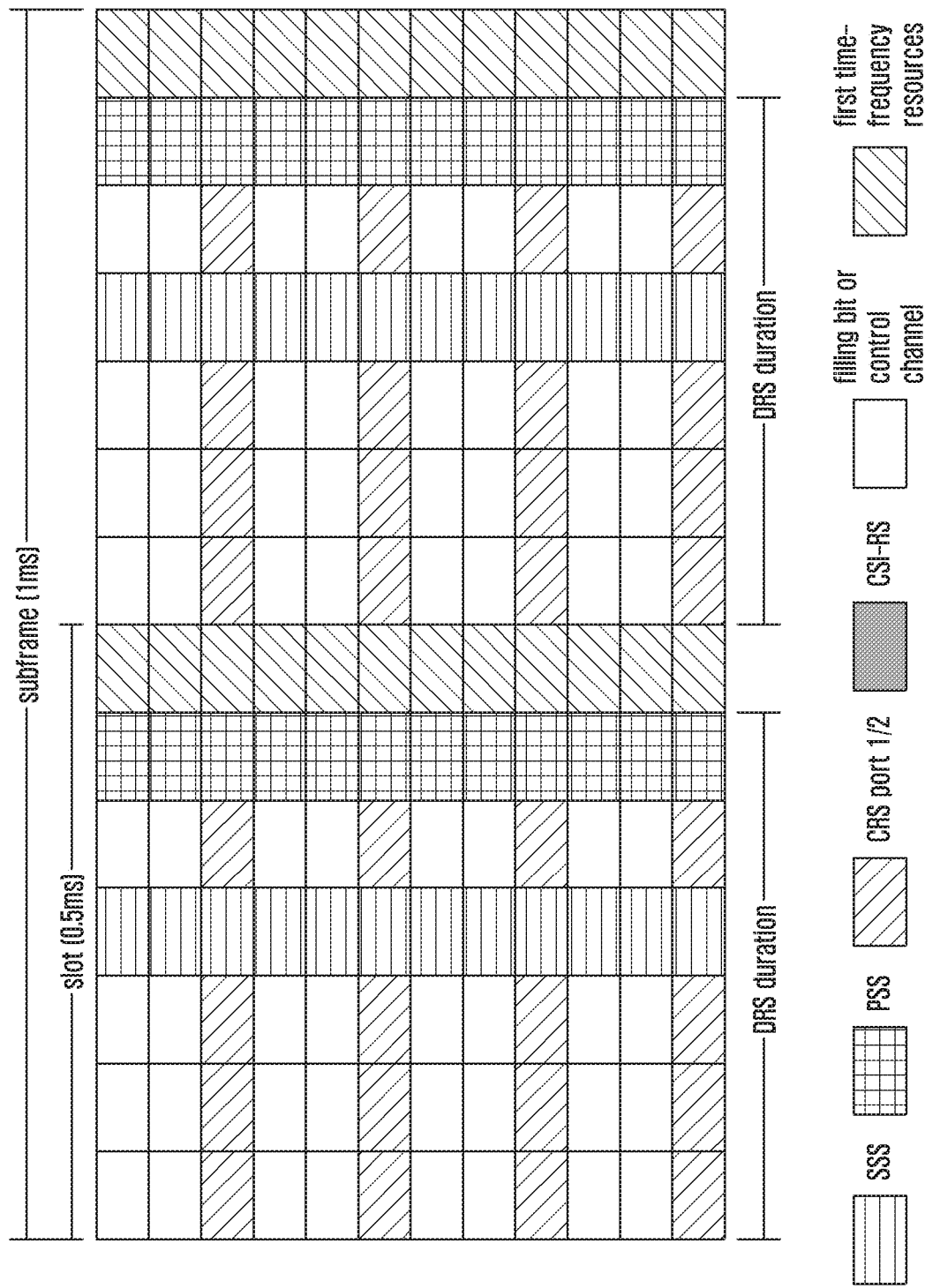
FIG. 8 is a diagram illustrating first time-frequency resources and a DRS in which reference signals adopts a new mapping mode according to an embodiment of the present disclosure.

FIG. 8 is a diagram illustrating first time-frequency resources and a DRS in which reference signals adopts a new mapping mode according to an embodiment of the present disclosure.

It should be noted that, the first time-frequency resources in a scenario that the base station is sending the reference signals and the first time-frequency resources in a scenario that the base station is sending the data signals/data signals and reference signals are different. For example, suppose the first time-frequency resources on which the base station is sending the reference signals are first resources A and the first time-frequency resources on which the base station is sending the data signals/data signals and reference signals are first resources B, the period T1 of the first resources A may be N times the period T2 of the first resources B in the DMTC time window.

Figure 9A:
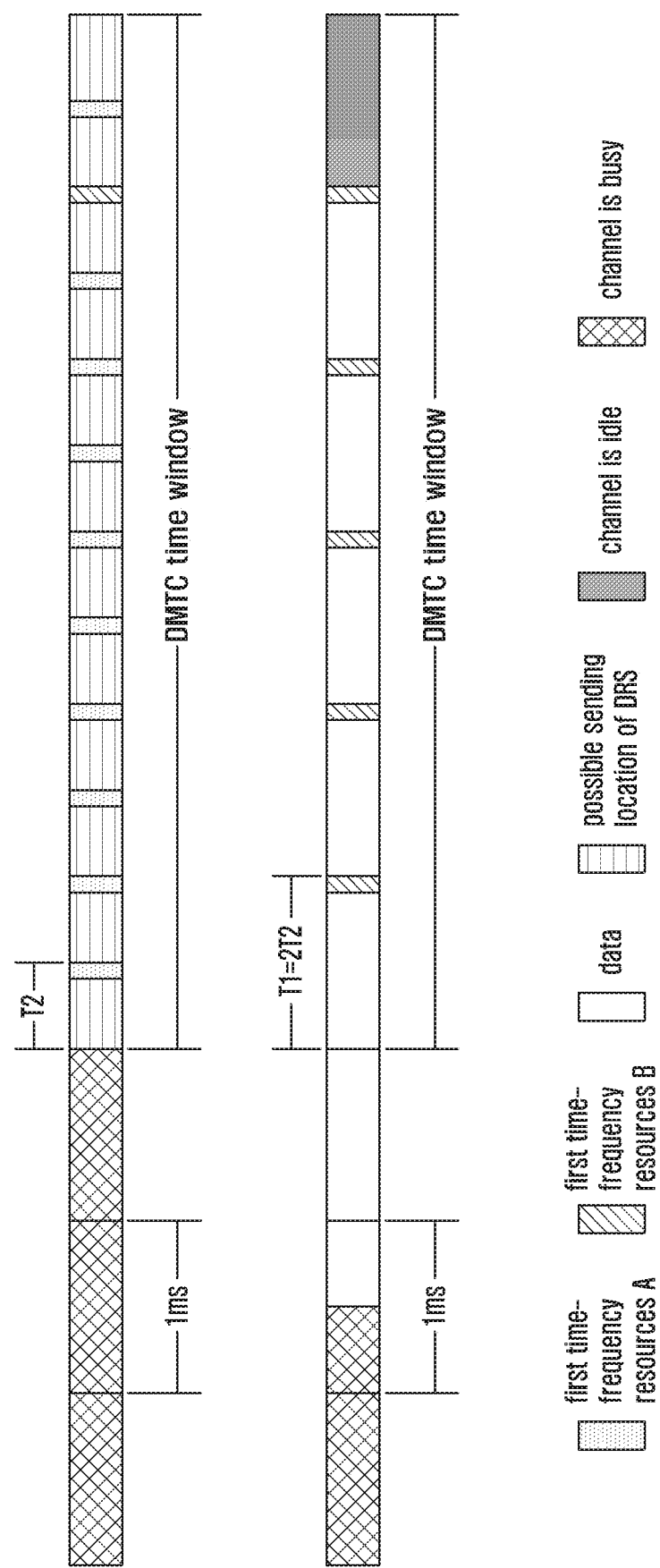
FIGS. 9A and 9B are diagrams illustrating first time-frequency resources when only reference signals are sent and first time-frequency resources when data signals/both data signals and reference signals are sent according to various embodiments of the present disclosure.
Figure 9B:
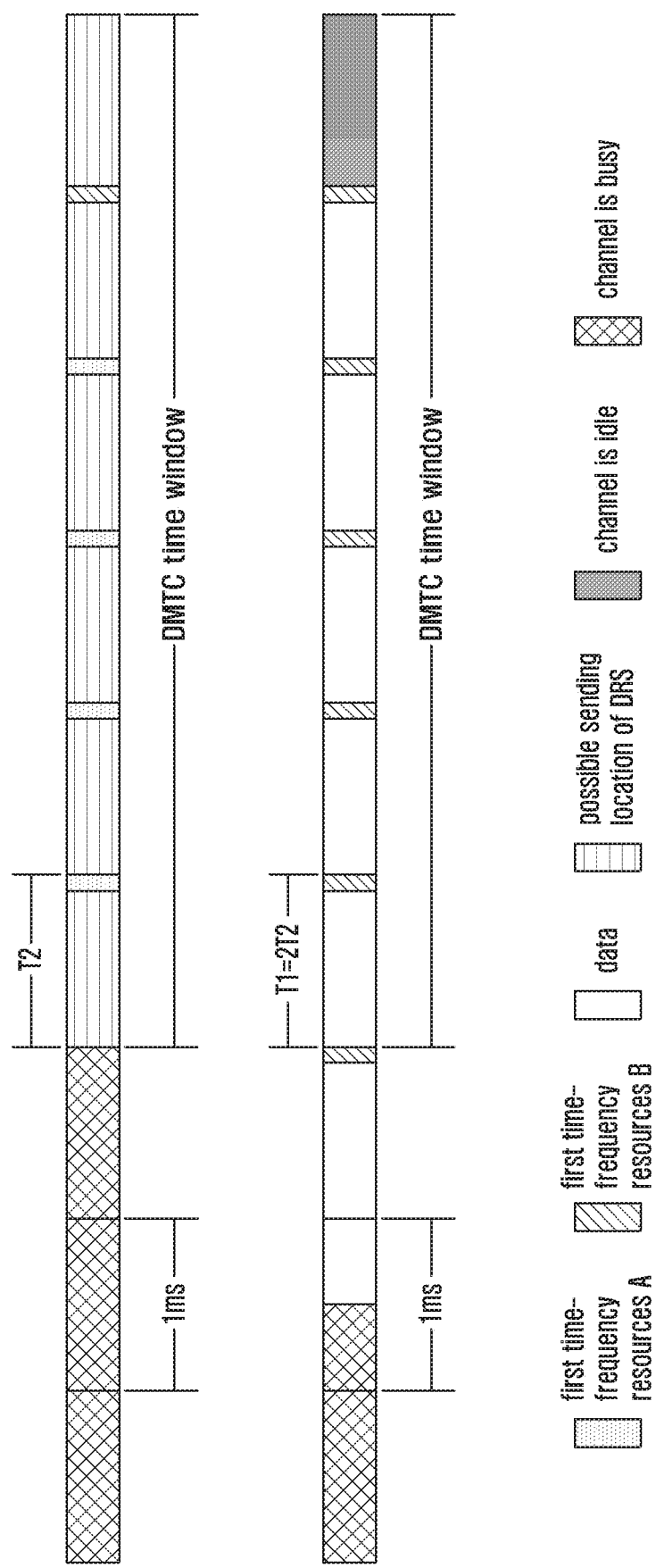

FIGS. 9A and 9B are diagrams illustrating first time-frequency resources when only reference signals are sent and first time-frequency resources when data signals/both data signals and reference signals are sent according to various embodiments of the present disclosure.

Referring to FIG. 9A, in the DMTC time window, a period of possible locations of the DRS is 0.5 ms, so the period T1 of the first resources A that are reserved by the base station when sending the DRS is 0.5 ms, and the period T2 of the first resources B that are reserved by the base station when sending the data signals is 1 ms.

Referring to FIG. 9B, in the DMTC time window, the period of possible locations of the DRS is 1 ms, so the period T1 of the first resources A that are reserved by the base station when sending the DRS is 1 ms, and the period T2 of the first resources B that are reserved by the base station when sending the data signals is equal to T1, i.e., 1 ms. However, the first resources B for sending the data signals by the base station contain resources before the DMTC time window, but the first resources A for sending the DRS by the base station do not contain the resource before the DMTC time window. In this embodiment, the first time-frequency resources for sending the reference signals by the base station and the first time-frequency resources for sending the data signals/data signals and reference signals are the same.

In a second definition mode, the first time-frequency resources appear in the period T1 in the time window, and/or appear at a location immediately adjacent to the beginning of the time window. The first time-frequency resources occupy X OFDM symbols on time dimension, where X is an integer (for example, X=1) or a fraction. The first time-frequency resources occupy a part of sub-carriers on frequency dimension. For example, on frequency dimension, in the entire system bandwidth or in a predefined bandwidth, the first time-frequency resources occupy a part of sub-carriers in an interval F1, or occupy a part of sub-carriers according to a predefined pattern. On these sub-carriers, the base station does not send any signal. For example, the first time-frequency resources are the last OFDM symbol in the period T1. In the OFDM symbol, F1=2 is an interval. That is, there is one idle sub-carrier every other one sub-carrier, and other sub-carriers may be used for sending data signals or reservation signals, for example, referring to the first pattern shown in FIG. 10.

Figure 10:
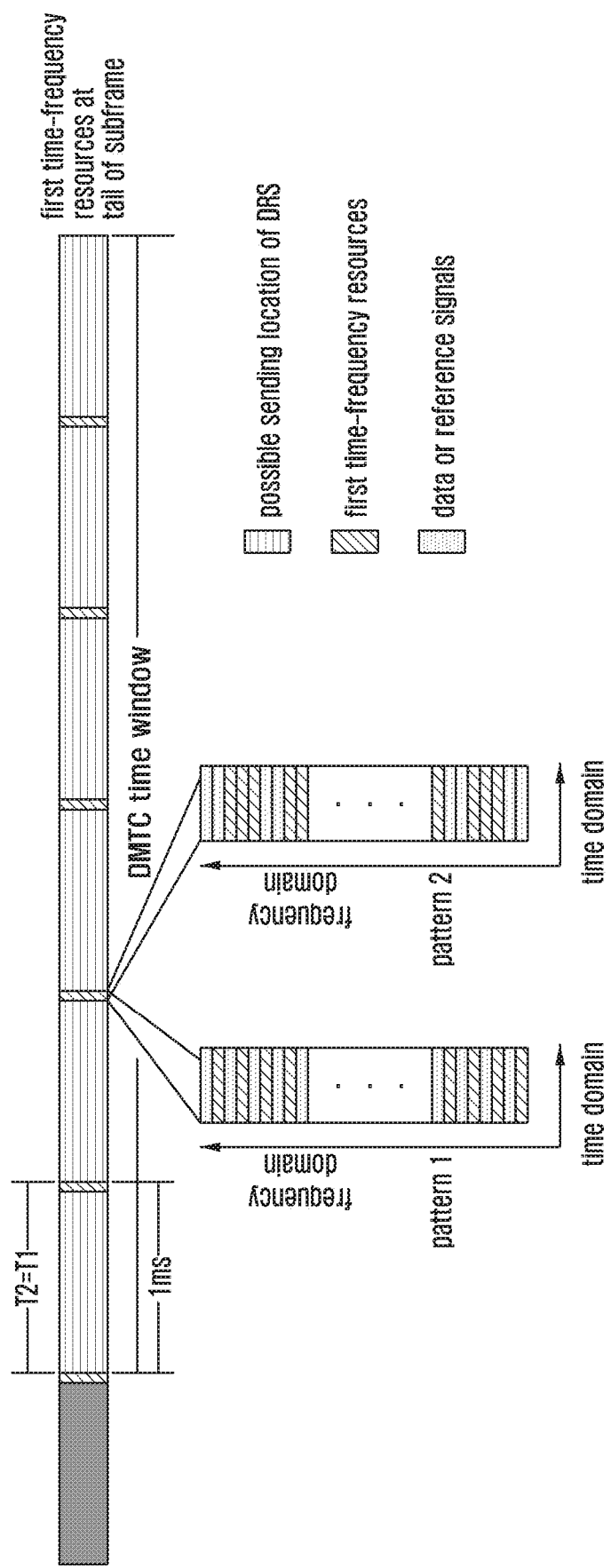
FIG. 10 is a diagram illustrating first time-frequency resources adopting a second definition mode according to an embodiment of the present disclosure.

FIG. 10 is a diagram illustrating first time-frequency resources adopting a second definition mode according to an embodiment of the present disclosure.

For example, the first time-frequency resources are the last OFDM symbol of the period T1. In the OFDM symbol, all or part of sub-carriers except the sub-carriers occupied by the DM-RS, referring to the second pattern shown in FIG. 10, do not need to change the location of the DM-RS. Similarly, if the OFDM symbol contains other reference signals, the first time-frequency resources are all or part of sub-carriers except the reference signals.

Compared with the first time-frequency resources described in the first definition mode, the first time-frequency resources described in the second definition mode may avoid that other communication nodes occupy the channel to some degree. In the second definition mode, an implementation mode that signals are not sent on the first time-frequency resources may be the same as that adopted in the first definition mode.

In a third definition mode, the first time-frequency resources appear in the period T1 in the time window, and/or appear at a location immediately adjacent to the beginning of the time window. The first time-frequency resources occupy X OFDM symbols on time dimension, where X is an integer (for example, X=1) or a fraction. The first time-frequency resources may be all sub-carriers on frequency dimension, or all sub-carriers in a predefined bandwidth, or partial predefined sub-carriers. On these time-frequency resources, the base station sends predefined signals.

The predefined signals may be distinguished by the same base station, or by base stations of the same operator, or by base stations of the same operator in a certain region, or by base stations with the same access technology in a certain region. Accordingly, these base stations may distinguish other base stations through the predefined signals when performing CCA detection, and thus do not regard the predefined signals of the base stations as interference signals, thereby supporting multiplexing among these base stations as much as possible.

Figure 11:
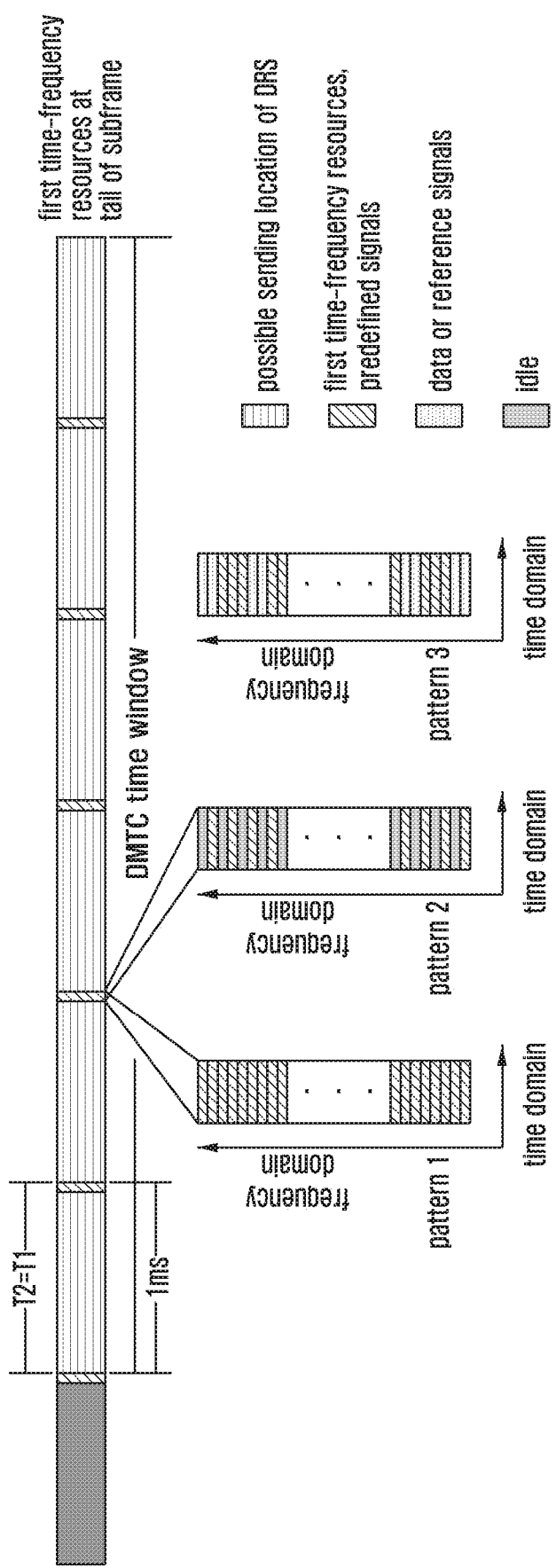
FIG. 11 is a diagram illustrating first time-frequency resources adopting a third definition mode according to an embodiment of the present disclosure.

FIG. 11 is a diagram illustrating first time-frequency resources adopting a third definition mode according to an embodiment of the present disclosure.

Referring to FIG. 11, the predefined signals may be reference signals containing specific identification (ID) information, or may be control signals containing specific ID information.

Similarly, if the first time-frequency resources and the DM-RS or RSs of the related art that must be sent in the DRS overlap, it is necessary to reset the location of these RSs. If the base station is sending data signals and reference signals or is sending data signals, the base station may avoid mapping the data signals and/or reference signals to the first time-frequency resources through rate matching or puncturing.

At block 102, in a predefined time window, the base station performs a type 2 channel sensing on second time-frequency resources, and decides whether to send data signals and/or reference signal according to a channel sensing result.

The channel sensing performed by the base station in the predefined time window is called the type 1 channel sensing. For example, in a transmission mechanism based on load based equipment (LBE), in an implementation mode (referring to option B in 4.8.3.2 of en_301893v010800v specification), the maximum transmission time is determined by a parameter q, where q is a parameter configured by a manufacturer and meets the requirements on the maximum transmission time in a certain region. The enhanced CCA (eCCA) detection of the channel sensing is determined by a parameter N, where N is not larger than q. In another implementation mode, the length of a competition window L is enlarged in a dynamic exponent or multiple relationship according to a predefined rule, or is configured in a semi-static mode. The range of the length of the competition window L is [L1, L2] eCCA slots, where L1 and L2 may be configured. For example, L1 and L2 need to meet requirements of a specification. The eCCA detection of the channel sensing is determined by the parameter N, the value of N is [0, L−1]. The maximum transmission time may be a predefined value, or may be relative to the value of L1 and/or L2. For example, in Japan, it is specified that the maximum transmission time is 4 ms. Suppose q=9, the number N of CCA slots corresponding to the eCCA detection is a random numeral among 0~q−1, for example, N is equal to 5. Herein, the type 1 channel sensing requires that the base station may perform initial CCA detection in an idle state. The initial CCA detection consists of one sensing interval, e.g., the sensing interval is 34 us or 25 us according to the specification. If the initial CCA detection is passed, the base station may directly send signals. If the initial CCA detection is not passed, the base station enters an eCCA state. After at least one defer, if there are N=5 idle CCA slots, the base station may send signals. In a non-idle state, the base station only enters the eCCA state.

The channel sensing performed in a predefined time window by the base station is called the type 2 channel sensing, which enables the base station to send signals with a shorter delay. The type 2 channel sensing may be applicable to a scenario that the base station finishes the CCA detection before the time window and begins to send signals, and/or applicable to a scenario that the base station does not finish the CCA detection before the time window but has data signals and DRS to be sent or only has data signals to be sent, and/or applicable to a scenario that the base station does not finish the CCA detection before the time window, but only has the DRS to be sent. The type 2 channel sensing may be implemented through five implementation modes. For the above different scenarios, the same implementation mode or different implementation modes may be adopted.

The type 2 channel sensing may be implemented through five implementation modes.

In a first implementation mode, the base station performs initial CCA detection on the second time-frequency resources.

If the initial CCA detection is passed, the base station may directly send data signals or send data signals and the DRS.

If the initial CCA detection is not passed, the base station performs initial CCA detection on the next second time-frequency resources.

The second time-frequency resources are a universal set or subset of the first time-frequency resources. The second time-frequency resources being a universal set of the first time-frequency resources means that the second time-frequency resources are the same as the first time-frequency resources. Referring to FIGS. 2A and 2B, suppose the length of the first time-frequency resources is one OFDM symbol, the length of the second time-frequency resources may be smaller than one OFDM symbol, for example, 34 us. In this embodiment, as the first time-frequency resources, the second time-frequency resources may appear periodically or a-periodically in the time window for a plurality of times. The following is described by taking an example that the second time-frequency resources appear periodically. In this implementation mode, the period of the first time-frequency resources and the period of the second time-frequency resources are the same, but the offset of the first time-frequency resources and the offset of the second time-frequency resources may be the same or different. The duration of the first time-frequency resources is larger than or equal to the duration of the second time-frequency resources.

The second time-frequency resources and the first time-frequency resources may overlap partially, or do not intersect with each other.

Preferably, for the base station sending data signals in subframes after the first time-frequency resources/second time-frequency resources, if the base station has passed the initial CCA detection before the end of the first time-frequency resources, the base station cannot send any signal or can only send predefined signals, thereby avoiding hindering other base stations. The predefined signals are signals that can be distinguished by other LTE nodes, for example, specific reference signals. Preferably, if the base station has passed the initial CCA detection before the end of the first time-frequency resources, the base station cannot send any signal, and the second time-frequency resources are a segment of slots before the next nearest possible sending location of the DRS, and the length of the second time-frequency resources is the length of the initial CCA slots. Preferably, if the base station has passed the initial CCA detection before the end of the first time-frequency resources, the base station sends predefined signals, the length of the second time-frequency resources may not be equal to the length of the initial CCA slots, and the second time-frequency resources may not be a segment of slots before the next nearest possible sending location of the DRS. For example, the beginning of the second time-frequency resources may be the beginning of the first time-frequency resources, and the length of the second time-frequency resources may be the length of one initial CCA slot. Once the initial CCA detection is passed, the base station may send the predefined signals until the end of the first time-frequency resources, and begins to send data signals after the end of the first time-frequency resources.

For the base station that only sends the DRS in the subframes after the first time-frequency resources/the second time-frequency resources, if the base station has passed the initial CCA detection before the end of the first time-frequency resources/the second time-frequency resources, the base station cannot send any signal or can only send predefined signals, thereby avoiding hindering other base stations. Or, as long as the base station passes the CCA detection, the base station begins to send signals. The signals may be signals that cannot be distinguished by other base stations.

The following description relates to a scenario that the base station sends data signals in the subframes after the first time-frequency resources/the second time-frequency resources, but is not limited to a scenario that the base station only sends the DRS in the subframes after the first time-frequency resources/the second time-frequency resources.

In a second implementation mode, the base station performs initial CCA detection on the second time-frequency resources.

If the initial CCA detection is passed, the base station may directly send data signals or send data signals and the DRS.

If the initial CCA detection is not passed, the base station enters eCCA by adopting zero defer, or adopting a defer shorter than the type 1 channel sensing, or adopting the same defer as the type 1 channel sensing. The number $N_1$ of idle slots for entering the eCCA by the base station may be a predefined value or a configured value. The predefined value may be determined according to the maximum consecutive transmission time of the base station in the time window. For example, if the parameter q is q1 when the maximum consecutive transmission time of the base station in the time window is 1 ms, and the parameter q is q2 when the maximum consecutive transmission time of the base station outside the time window is 4 ms, the eCCA idle slots N1 of the type 2 channel sensing is a random integer among 0~q1−1, i.e., N1∈[0,q1−1], and the eCCA idle slots of the type 1 channel sensing is N∈[0,q2−1]. It is easy to understand that, since the maximum consecutive occupation time of the base station in the time window is shortened, the required eCCA idle slots are shortened. If the eCCA is passed before the next second time-frequency resources or before the next second time-frequency resources and possible beginnings of supportable partial subframes, the base station may send signals on other resources except the first time-frequency resources or at the possible beginnings of supportable partial subframes until the next second time-frequency resources, and perform initial CCA detection on the next second time-frequency resources. If the eCCA is not passed before the beginning of the next second time-frequency resources, the base station performs initial CCA detection on the next second time-frequency resources. It should be noted that the length of the maximum competition window of the eCCA may be unchanged. Before the next second time-frequency resources, the base station may suspend eCCA counting or continue the eCCA counting. For example, the second time-frequency resources may be determined by the possible beginnings of supportable partial subframes. For example, the possible beginnings of supportable partial subframes may be the $0^{th}$, $4^{th}$ and $7^{th}$ OFDM symbols, and the end of the second time-frequency resources is the beginning of the $7^{th}$ OFDM symbol.

Figure 12:
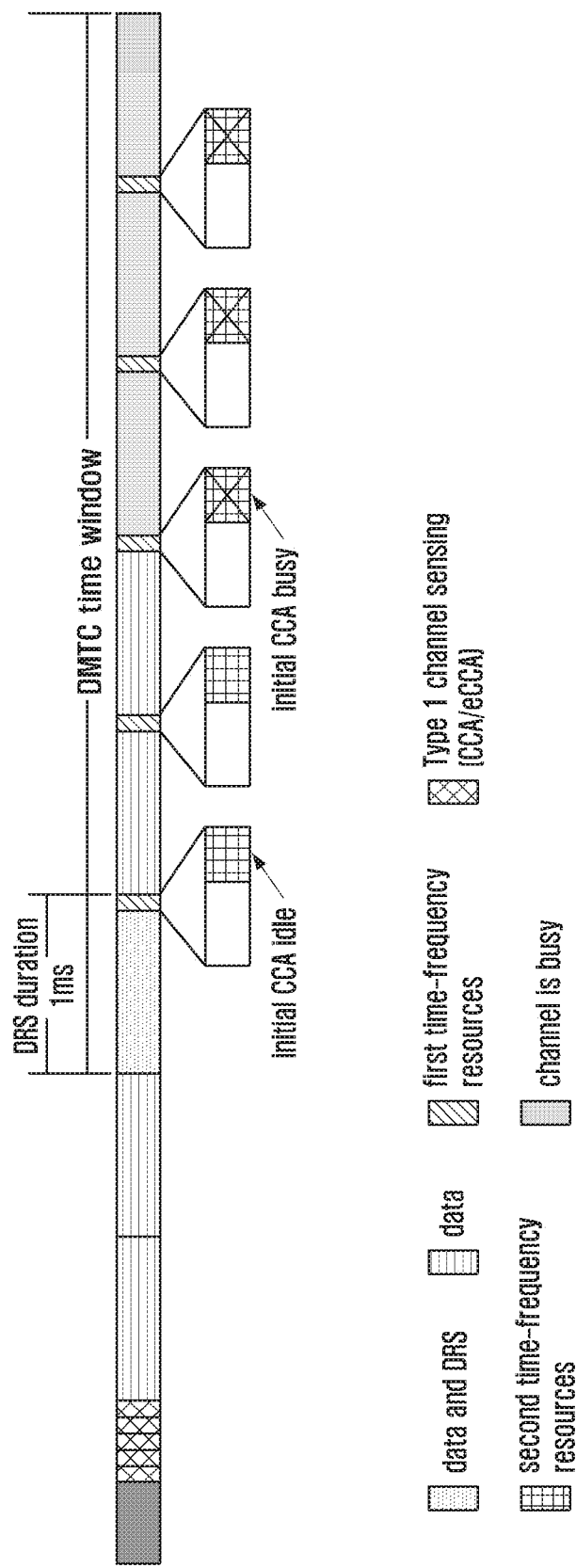
FIG. 12 is a diagram illustrating a first implementation mode of type 2 channel sensing according to an embodiment of the present disclosure.

FIG. 12 is a diagram illustrating a first implementation mode of type 2 channel sensing according to an embodiment of the present disclosure.

Figure 13:
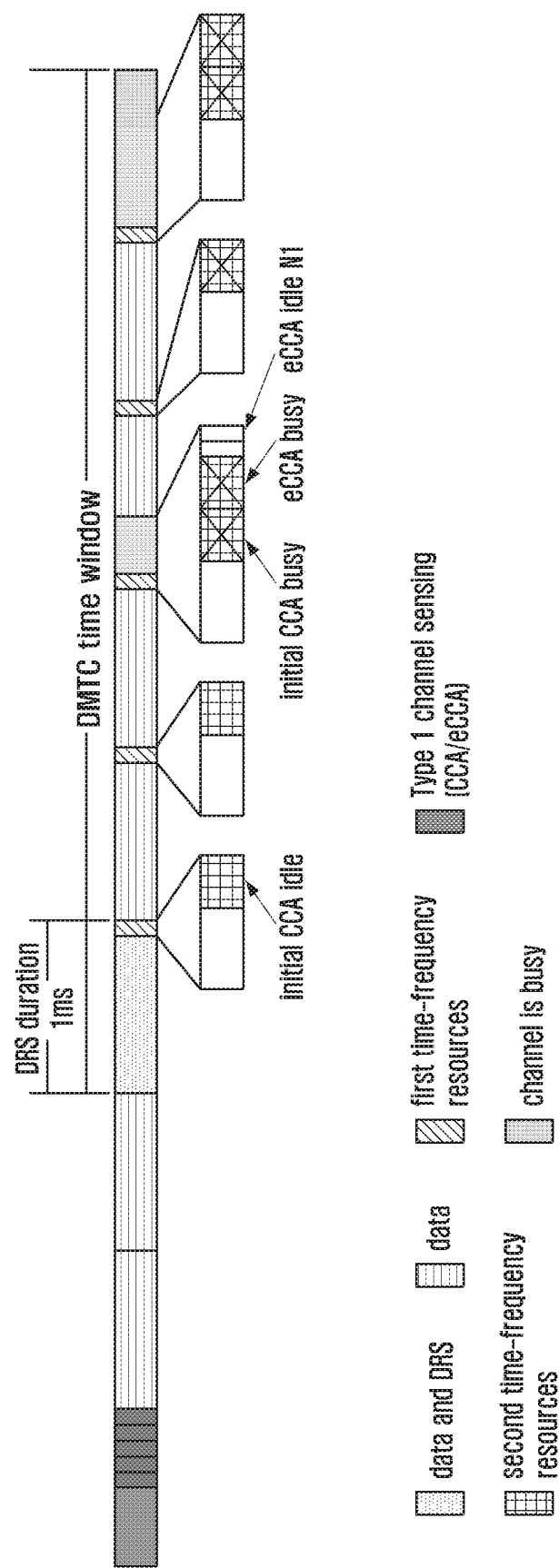
FIG. 13 is a diagram illustrating a second implementation mode of type 2 channel sensing according to an embodiment of the present disclosure.

FIG. 13 is a diagram illustrating a second implementation mode of type 2 channel sensing according to an embodiment of the present disclosure.

The second time-frequency resources and the first time-frequency resources may overlap partially. Referring to FIG. 13, the second time-frequency resources corresponding to the initial CCA detection are a subset of the first time-frequency resources. If the initial CCA detection is failed, the base station enters eCCA, the second time-frequency resources corresponding to the eCCA may overlap with the first time-frequency resources partially, i.e., the second time-frequency resources exceed the first time-frequency resources. When the second time-frequency resources exceed the first time-frequency resources, as mentioned above, the end of the second time-frequency resources may be predefined.

It should be noted that, the base station cannot send any signal or can only send predefined signals on the first time-frequency resources, thereby avoiding hindering other base stations. For example, if the base station has passed the initial CCA detection or the eCCA detection before the end of the first time-frequency resources, the sending operation performed by the base station on the first time-frequency resources must meet the above requirements.

In a third implementation mode, the base station performs initial CCA detection on the second time-frequency resources.

If the initial CCA detection is passed, the base station may directly send data signals or send data signals and the DRS.

Figure 14:
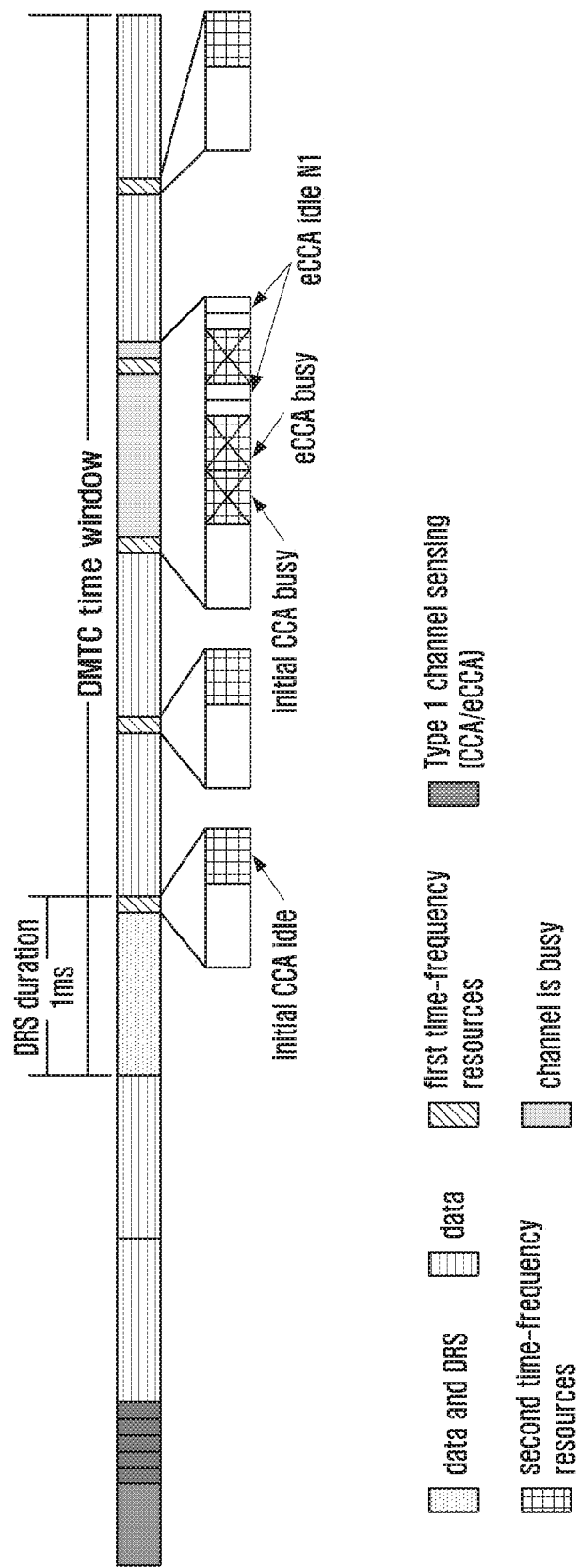
FIG. 14 is a diagram illustrating a third implementation mode of type 2 channel sensing according to an embodiment of the present disclosure.

FIG. 14 is a diagram illustrating a third implementation mode of type 2 channel sensing according to an embodiment of the present disclosure.

If the initial CCA detection is not passed, the base station enters eCCA by adopting zero defer, or adopting a defer shorter than the type 1 channel sensing, or adopting the same defer as the type 1 channel sensing. The number $N_1$ of idle slots for entering the eCCA by the base station may be a predefined value or a configured value. If the eCCA detection is passed before the beginning of the next second time-frequency resources, the base station may send signals on other resources except the first time-frequency resources until the next second time-frequency resources, and perform the initial CCA detection on the next second time-frequency resources. If the eCCA detection is not passed before the beginning of the next second time-frequency resources, the base station continues the eCCA detection on the next second time-frequency resources, as shown in FIG. 14.

Similarly, the base station cannot send any signal or can only send predefined signals on the first time-frequency resources, thereby avoiding hindering other base stations. For example, if the base station has passed the initial CCA detection or the eCCA detection before the end of the first time-frequency resources, the sending operation performed by the base station on the first time-frequency resources must meet the above requirements.

In a fourth implementation mode, the base station performs the initial CCA detection on the second time-frequency resources.

If the base station is in an idle state, the base station performs the initial CCA detection on the second time-frequency resources according to the second or third implementation mode.

If the base station is not in the idle state, the base station performs the eCCA detection on the second time-frequency resources. The eCCA detection may be implemented according to the eCCA detection described in the second or third mode.

In the fourth implementation mode, the type 2 channel sensing has the same process as the type 1 channel sensing. The difference lies in that the number of eCCA idle slots in the type 2 channel sensing is different from that in the type 1 channel sensing, referring to the description in the second implementation mode.

The difference between the fourth implementation mode and the first, second and third implementation modes lies in that in the fourth implementation mode, the base station cannot perform the initial CCA detection unless the base station is in the idle state, which is not limited in the first, second and third implementation modes.

Similarly, the base station cannot send any signal or can only send predefined signals on the first time-frequency resources, thereby avoiding hindering other base stations. For example, if the base station has passed the initial CCA detection or the eCCA detection before the end of the first time-frequency resources, the sending operation performed by the base station on the first time-frequency resources must meet the above requirements.

The length of the initial CCA slots in the type 2 channel sensing in the above four implementation modes may be different from the length of the initial CCA slots in the type 1 channel sensing, and/or the length of the eCCA slots in the above four implementation modes may be different from the length of the eCCA slots in the type 1 channel sensing. For example, in order to enable the base station of which data transmission is interrupted in the DMTC time window to grab a channel as fast as possible, the length of the initial CCA slots and/or the length of the eCCA slots in the type 2 channel sensing may be shortened. For example, the length of the initial CCA slots in the type 2 channel sensing is smaller than 34 us, and the length of the initial CCA slots in the type 1 channel sensing is equal to 34 us. For example, in order to avoid that the base station adopting the first implementation mode is much radical than WiFi, the length of the initial CCA slots in the type 2 channel sensing may be larger than 34 us, and the length of the initial CCA slots in the type 1 channel sensing may be equal to 34 us.

In a fifth implementation mode, the base station does not perform the initial CCA detection on the second time-frequency resources, but directly send signals. Preferably, the fifth implementation mode is adapted to combine with the second definition mode or the third definition mode of the first time-frequency resources at block 101 of FIG. 1. In the second definition mode or the third definition mode of the first time-frequency resources, the base station does not send signals only on part of sub-carriers or send signals on part/all sub-carriers, and the signals of the base station on the first time-frequency resources and the second time-frequency resources are not completely idle on time dimension. Accordingly, it can be deemed that the base station consecutively occupies the channel, and thus a scenario usually does not appear that WiFi grabs the channel on the first time-frequency resources.

Preferably, the type 2 channel sensing is applicable to a scenario that there are data signals to be sent in the time window. Preferably, the type 2 channel sensing is applicable to data transmission before the last first time-frequency resources in the time window.

Figure 15:
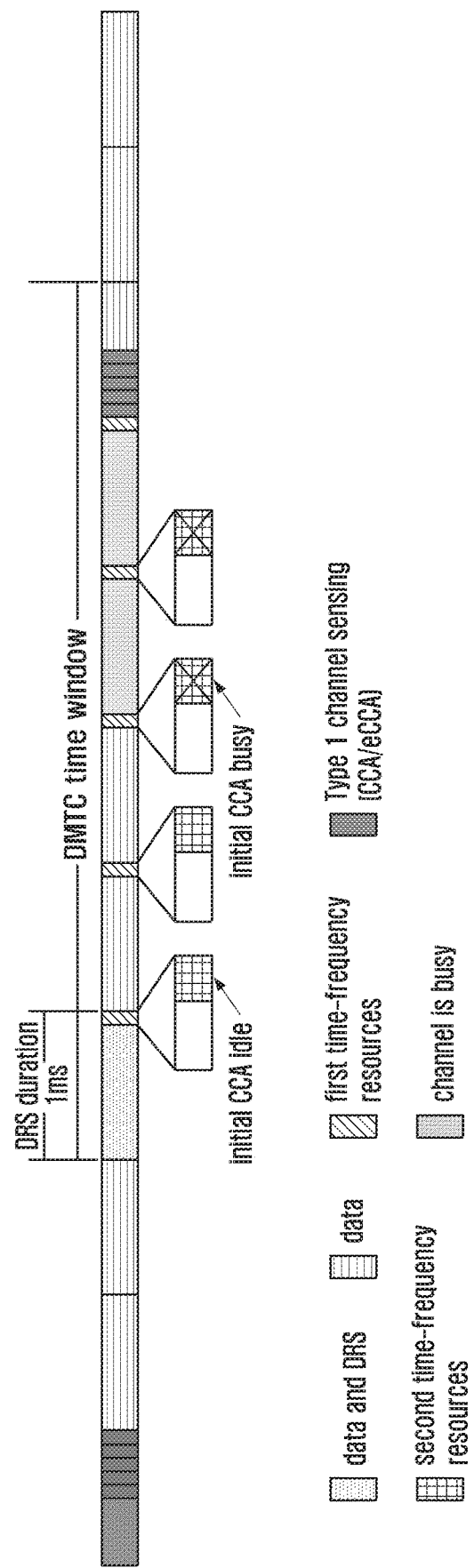
FIG. 15 is a diagram illustrating type 2 channel sensing in a scenario that there are data signals to be sent in a DMTC time window according to an embodiment of the present disclosure.

FIG. 15 is a diagram illustrating type 2 channel sensing in a scenario that there are data signals to be sent in a DMTC time window according to an embodiment of the present disclosure.

For example, referring to FIG. 15, the base station performs the type 2 channel sensing on the second time-frequency resources at the end of the $1^{th}$~$4^{th}$ subframes in the DMTC time window, and performs the type 1 channel sensing at the end of the $5^{th}$ subframe. There are no first time-frequency resources in the $6^{th}$ subframe, which means that, once the base station grabs the channel, the base station may consecutively send data signals until general maximum occupation time. That is to say, the data transmission starting from the $6^{th}$ subframe in the DMTC time window is the same as the data transmission outside the DMTC time window, and thus the type 1 channel sensing should be adopted. Preferably, the type 2 channel sensing is only applicable to a scenario that the base station has occupied the channel through the type 1 channel sensing and begun to send data signals before the time window. For other scenarios, the type 1 channel sensing is adopted.

Figure 16:
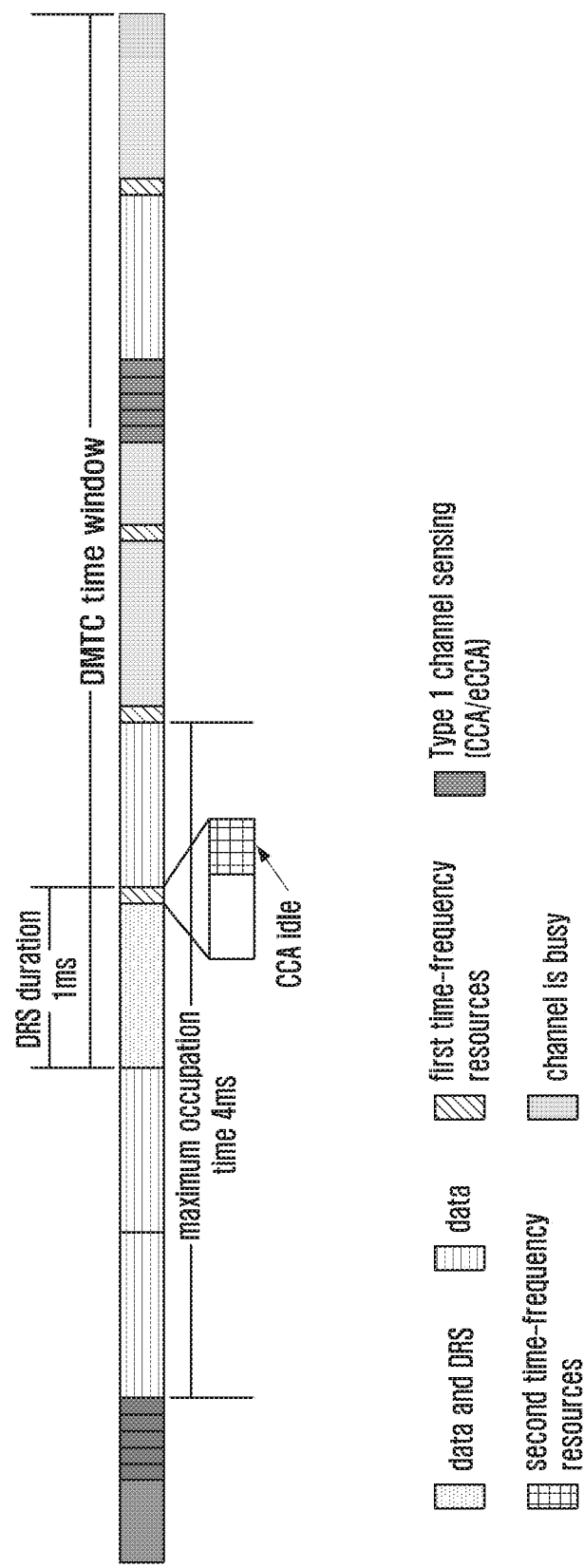
FIG. 16 is a diagram illustrating type 2 channel sensing in a scenario that a channel has been occupied before a DMTC time window to send data signals according to an embodiment of the present disclosure.

FIG. 16 is a diagram illustrating type 2 channel sensing in a scenario that a channel has been occupied before a DMTC time window to send data signals according to an embodiment of the present disclosure.

For example, if the base station has occupied the channel and begun to send data signals before the time window and the channel occupation time does not exceed the maximum occupation time, referring to FIG. 16, the type 2 channel sensing is performed on the second time-frequency resources at the end of the first subframe in the DMTC time window. After the sending time of the base station reaches the maximum occupation time, the base station prepares the next transmission. In this case, the type 1 channel sensing is adopted. For another example, if the base station performs the type 1 channel sensing before the DMTC time window, but the value of the eCCA counter does not become 0, and the CCA detection of the DRS is passed, the base station sends the DRS in the DMTC time window. After sending the DRS, the base station continues the uncompleted type 1 channel sensing. If the eCCA detection is passed, the base station may send data signals. The process of continuing the uncompleted type 1 channel sensing may include, when sending the DRS, suspending the CCA counter, and after sending the DRS, continuing counting the counter of the type 1 channel sensing. Or, the base station may count the counter of the type 2 channel sensing after sending the DRS. That is to say, N may be determined according to the maximum occupation time q1. If the sending time has missed when the value of the counter becomes 0, the base station may perform the initial CCA detection on the next second time-frequency resources. Or, if the value of the counter does not become 0, the base station may suspend the counter and continue the CCA detection of the type 2 channel sensing on the next second time-frequency resources. Similarly, if the base station only has data signals rather than the DRS to be sent and performs the type 1 channel sensing before the DMTC time window, and the value of the eCCA counter does not become 0, the base station may suspend the counter and continue the CCA detection of the type 2 channel sensing on the next second time-frequency resources. Or, the base station may not perform the type 1 channel sensing but perform the type 2 channel sensing in the time window, for example, adopts the fourth implementation mode of the type 2 channel sensing.

Preferably, if the base station has occupied the channel through the type 1 channel sensing and begun to send data signals before the time window, the implementation mode X of the type 2 channel sensing is adopted. If the base station has not occupied the channel through the type 1 channel sensing before the time window, or the base station has consecutively occupied the channel for time q2 through the implementation mode X of the type 2 channel sensing, the implementation mode Y of the type 2 channel sensing is adopted. The implementation mode X may be different from the implementation mode Y.

Figure 17:
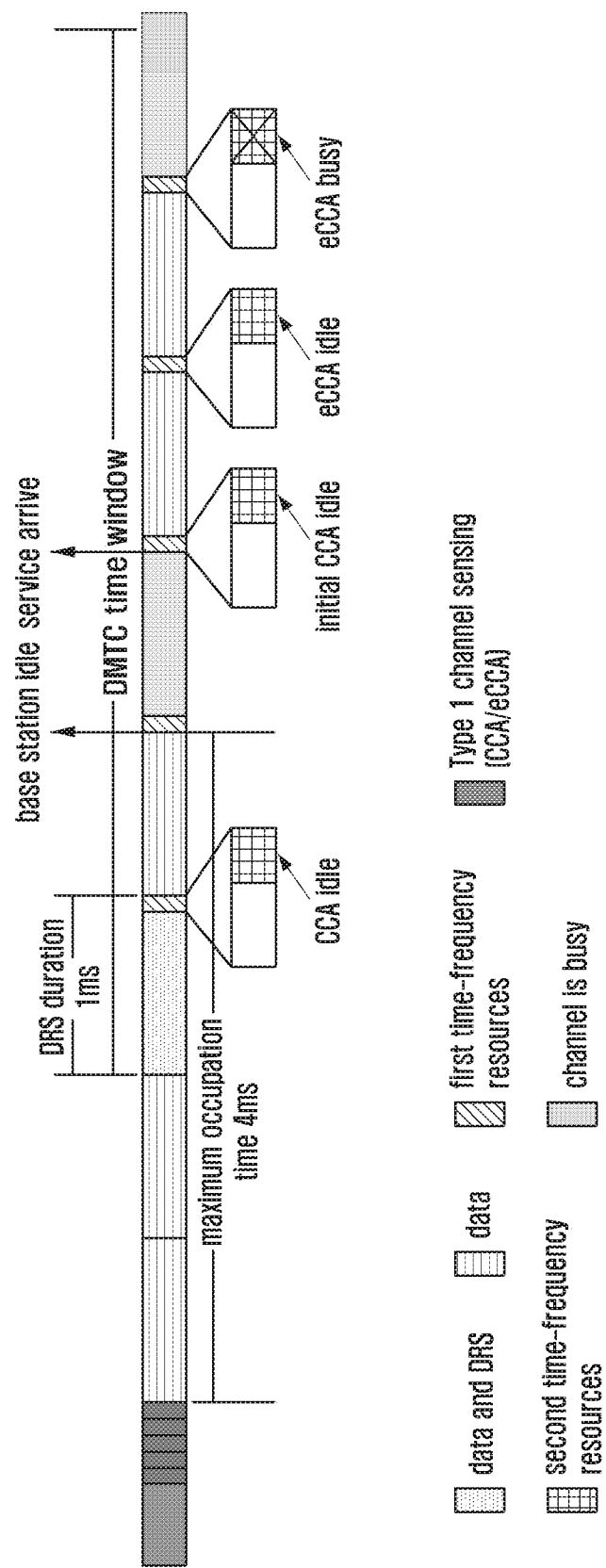
FIG. 17 is a diagram illustrating type 2 channel sensing performed in a DMTC time window through two modes according to an embodiment of the present disclosure.

FIG. 17 is a diagram illustrating type 2 channel sensing performed in a DMTC time window through two modes according to an embodiment of the present disclosure.

For example, referring to FIG. 17, if the base station has occupied the channel through the type 1 channel sensing and begun to send data signals before the time window, the base station adopts the first implementation mode of the type 2 channel sensing. If the base station has data to be sent in the DMTC time window or the base station has not occupied the channel through the type 1 channel sensing before the DMTC time window, the base station adopts the fourth implementation mode of the type 2 channel sensing.

The foregoing is the implementation of the method for channel sensing and signal transmission in the first embodiment.

In the description of the first embodiment and FIG. 1, block 101 is prior to block 102. In actual applications, as mentioned above, for consecutive subframes of the data signals and/or reference signals in the time window, the channel sensing may occur before the time window or in the time window. Accordingly, in the time window, the consecutive subframes of the data signals and/or reference signals may occur before certain channel sensing or after certain channel sensing. Or, there may be only signal transmission but no channel sensing in the time window. Mapping to the blocks in this embodiment, block 101 may be prior to block 102 or may follow block 102. Or there is only block 101, or there is only block 102. For example, before the first time-frequency resources, if the sending node has occupied the channel and begun to send data signals before the time window and the consecutive transmission time does not exceed the maximum occupation time, the base station may not perform channel sensing consecutive transmission in the time window until the maximum occupation time. For example, suppose the maximum occupation time of unlicensed frequency bands is 4 ms, the base station has consecutively sent data signals for 3 ms before the DMTC time window, and the first time-frequency resources appear at the end of the first subframe in the DMTC time window. In this case, the base station does not need to perform channel sensing before the first subframe in the DMTC time window, but directly sends data signals. When sending data signals, the base station does not send signals or send predefined signals on the first time-frequency resources. If the base station has no new data to be sent after this transmission, the base station may not perform any channel sensing until new data arrive. In this case, only block 101 is performed. If the base station has new data to be sent, the base station performs channel sensing in the DMTC time window, and does not send signals or send predefined signals on the first time-frequency resources. In this case, block 101 is performed firstly, and then block 102 is performed.

For example, if the base station does not occupy the channel before the DMTC time window and has data to be sent, the base station performs channel sensing in the DMTC time window. If the channel sensing is passed, the base station may send signals, but does not send signals or only send predefined signals on the first time-frequency resources. In this case, block 102 is performed firstly, and then block 101 is performed. This embodiment is not limited to the above examples. When data signals and/or reference signals are sent for a plurality of times in the time window, blocks 101 and 102 may be performed alternately. In this embodiment and FIG. 1, block 101 is performed before block 102, which is only one of actual applications but is not limited to this case in implementations.

A second embodiment is implemented as follows.

In the second embodiment, when only sending reference signals in the time window, the sending node performs channel sensing on third time-frequency resources and sends signals after CCA detection is finished.

Figure 18:
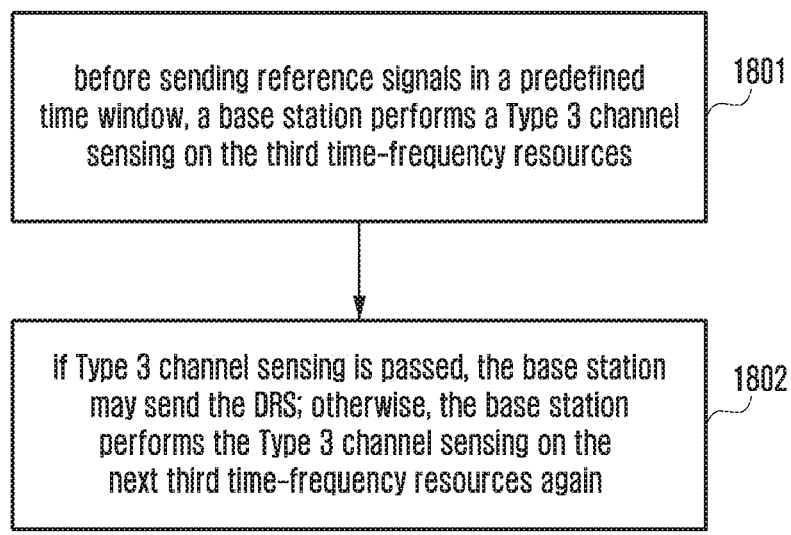
FIG. 18 is a flowchart illustrating a method for channel sensing and signal transmission according to a second embodiment of the present disclosure.

FIG. 18 is a flowchart illustrating a method for channel sensing and signal transmission according to a second embodiment of the present disclosure.

Referring to FIG. 18, the method includes following blocks.

At block 1801, before sending reference signals in a predefined time window, a base station performs a type 3 channel sensing on the third time-frequency resources. The third time-frequency resources and the first time-frequency resources overlap. The base station performs energy detection and/or sequence detection in time domain or in frequency domain on the third time-frequency resources.

The third time-frequency resources and the first time-frequency resources overlap, which may be one of following cases.

In a first case, the third time-frequency resources are a subset or universal set of the first time-frequency resources.

Figure 19:
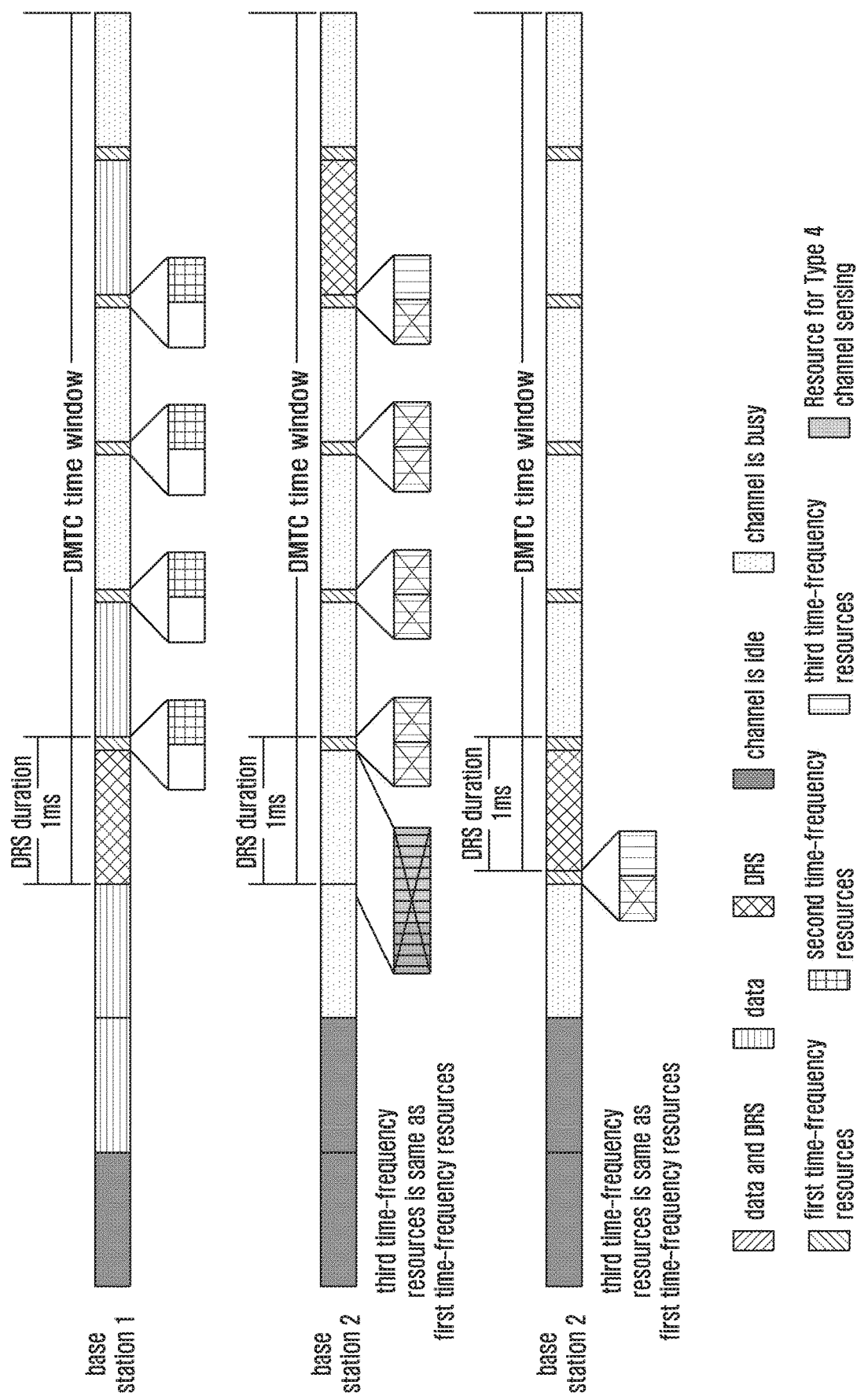
FIG. 19 is a diagram illustrating type 3 channel sensing when third time-frequency resources are a universal set of first time-frequency resources according to an embodiment of the present disclosure.

FIG. 19 is a diagram illustrating type 3 channel sensing when third time-frequency resources are a universal set of first time-frequency resources according to an embodiment of the present disclosure.

Referring to FIG. 19, suppose the third time-frequency resources are the universal se of the first time-frequency resources. Suppose base station 1 and base station 2 are on the same carrier and may receive signals from each other. Suppose the base station 1 has begun to send data before the DMTC time window and the base station 2 has no data to be sent but needs to send the DRS in the DMTC time window. The base station 2 may perform the CCA detection before the beginning of the DMTC time window, which is called a type 4 channel sensing to distinguish from the CCA detection performed when sending data signals. In this embodiment, how the base station performs type 4 channel sensing is not limited. This embodiment mainly describes how the type 3 channel sensing is performed. The type 4 channel sensing may be the same as type 3 channel sensing. If the base station 2 does not pass the type 4 channel sensing, the base station 2 performs the type 3 channel sensing on the third time-frequency resources in the DMTC time window. For example, the last X OFDM symbol in the end of each subframe in the DMTC time window. The base station 2 may send the DRS for once time at the nearest possible sending location of the DRS if the channel is sensing to be idle for one sensing slot. After sending the DRS, if the base station 2 still has no data to be sent, the base station 2 may not perform channel sensing. After sending the DRS, if the base station 2 has data to be sent, the base station 2 may perform the type 1 channel sensing or the type 2 channel sensing.

Since the base station 1 does not send any signal or send signals that can be recognized by UEs when the base station 2 performs the type 3 channel sensing, the base station 1 does not interfere with the channel sensing of the base station 2.

In a second case, the third time-frequency resources are a superset of the first time-frequency resources.

Figure 20:
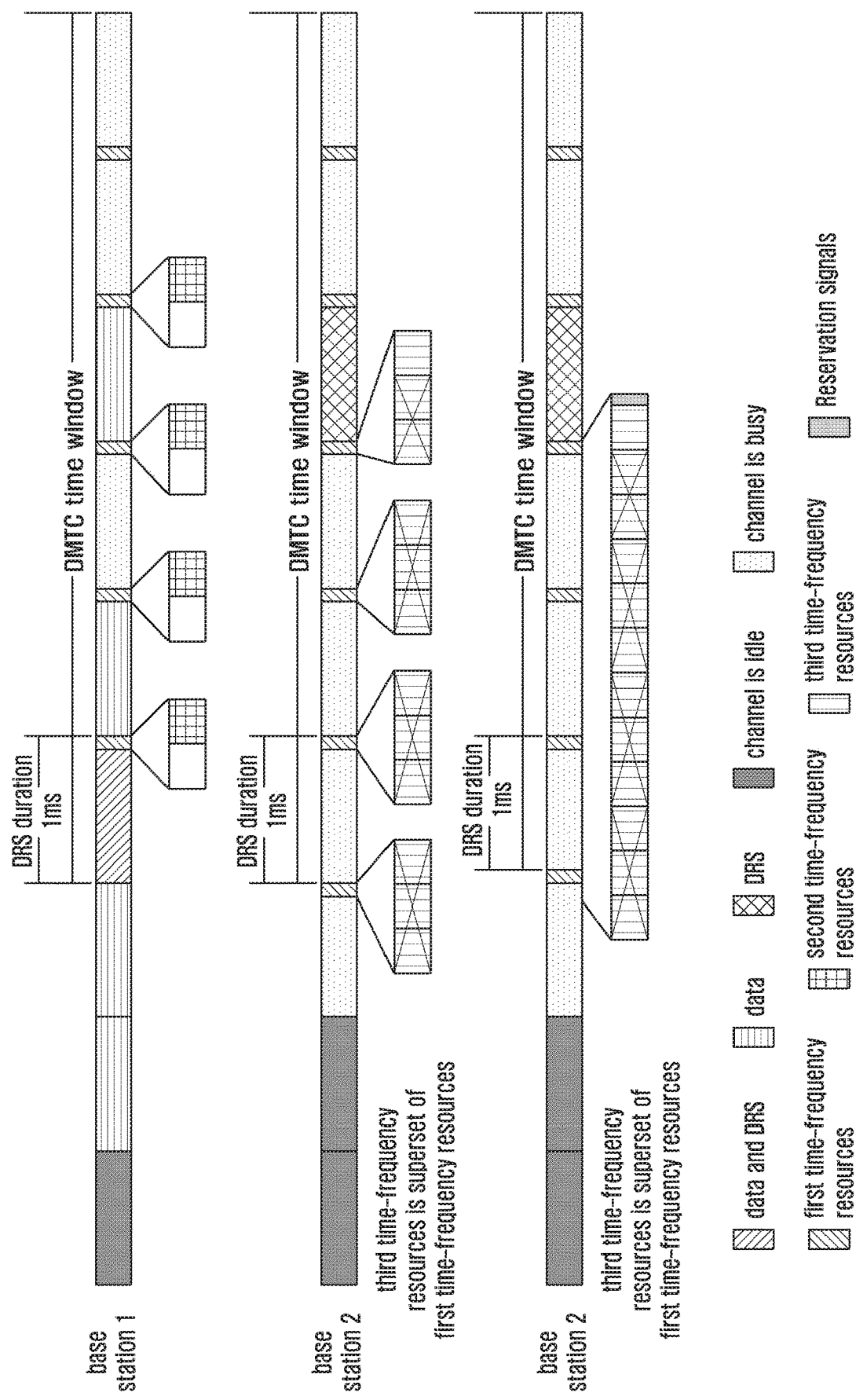
FIG. 20 is a diagram illustrating type 3 channel sensing when third time-frequency resources is a superset of first time-frequency resources according to an embodiment of the present disclosure.

FIG. 20 is a diagram illustrating type 3 channel sensing when third time-frequency resources is a superset of first time-frequency resources according to an embodiment of the present disclosure.

Referring to FIG. 20, the third time-frequency resources may be a segment of time-frequency resources before the beginning of each possible sending location of the DRS. The third time-frequency resources contain the first time-frequency resources. Even, the third time-frequency resources start from the beginning of the DMTC time window and contain the entire DMTC time window. The base station 2 performs the type 3 channel sensing on the third time-frequency resources. When there is one idle channel sensing slot, the base station 2 may send the DRS for once time at the nearest possible sending location of the DRS. In this way, though the signals sent by the base station 1 may result in that the base station 2 performs the type 3 channel sensing and one or more channel sensing slots may be interfered, it can be ensured that the base station 1 does not interfere with the channel sensing of the base station 2 in the channel sensing slots corresponding to the first time-frequency resources.

Figure 21:
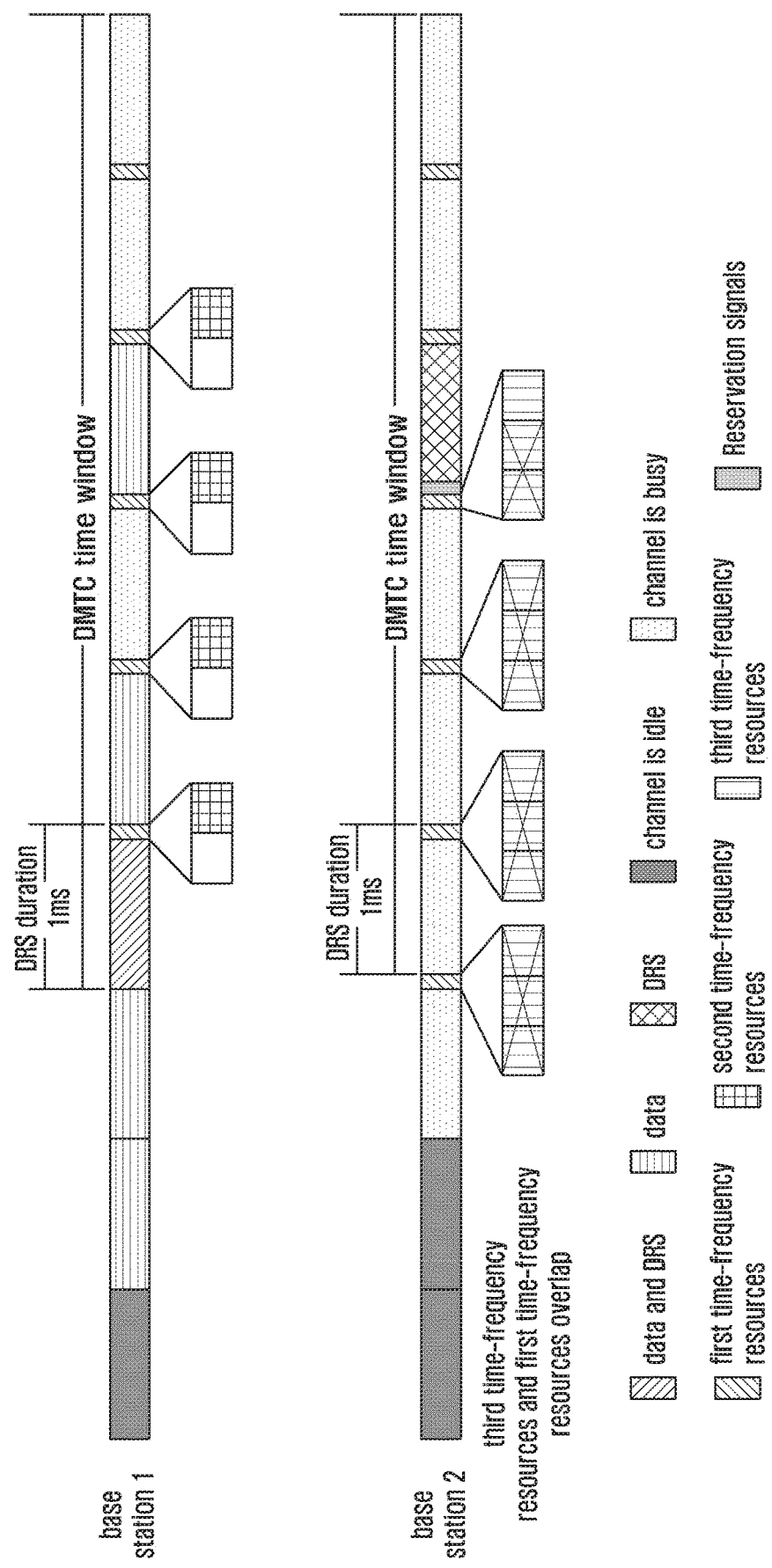
FIG. 21 is a diagram illustrating type 3 channel sensing when third time-frequency resources and first time-frequency resources intersect partially according to an embodiment of the present disclosure.

FIG. 21 is a diagram illustrating type 3 channel sensing when third time-frequency resources and first time-frequency resources intersect partially according to an embodiment of the present disclosure.

Referring to FIG. 21, in a third case, the third time-frequency resources and the first time-frequency resources overlap partially. Similarly, though the signals sent by the base station 1 may result in that the base station 2 performs the type 3 channel sensing and one or more channel sensing slots may be interfered, it can be ensured that the base station 1 does not interfere with the channel sensing of the base station 2 in the channel sensing slots corresponding to the first time-frequency resources.

Preferably, if the first definition mode of the first time-frequency resources in the first embodiment is adopted, the base station may perform energy detection in time domain on the third time-frequency resources.

Preferably, if the second definition mode of the first time-frequency resources in the first embodiment is adopted, the base station may perform energy detection in time domain on the third time-frequency resources.

Preferably, if the third definition mode of the first time-frequency resources in the first embodiment is adopted, the base station may perform sequence detection in time domain or frequency domain on the third time-frequency resources. The sequence detection refers to that the base station tries to detect a possible sequence, and determine a threshold of the channel sensing, for example, set different thresholds according to whether a sequence is detected, or compare with the threshold after subtracting the energy of the detected sequence.

At block 1802, if the type 3 channel sensing is passed, that is, if the power detected by the base station is less than a predefined threshold, the base station may send the DRS; otherwise, the base station performs the type 3 channel sensing on the third time-frequency resources again.

Preferably, if the base station passes the type 3 channel sensing on the first time-frequency resources or the second time-frequency resources, the base station does not send any signal or only sends distinguishable signals according to the definition mode of the first time-frequency resources (that is, according to the signal processing mode adopted when only the reference signals are sent at block 101 in the first embodiment) until the nearest possible sending location of the DRS, and sends the DRS.

Preferably, if the base station passes the type 3 channel sensing on the first time-frequency resources or the second time-frequency resources, the base station may send reservation signals until the nearest possible sending location of the DRS, and sends the DRS.

As can be seen from the implementation of the method for channel sensing and signal transmission provided by the present disclosure, because signals are not sent or only predefined signals are sent on some reserved resources, channel sensing resources for sending reference signals may be reserved for other sending nodes, thereby avoiding that a sending nodes of the same system hinders another sending node from using unlicensed frequency bands, improving the frequency domain multiplexing coefficient among nodes adopting the same access technology, and ensuring the coexistence of the access technology and others. Further, through setting the type 2 channel sensing on the second time frequency domain resources, the length of LBT may be shortened when the reference signals are sent, thereby rapidly sending the reference signals. In addition, through setting the type 3 channel sensing on the third time-frequency resources, the interference with the channel sensing by different base stations of the LAA system can be avoided.

The present disclosure also provides an equipment for channel sensing and signal transmission, which may be applied to the above method. The equipment includes a channel sensing unit and a signal sending unit. The channel sensing unit may be at least one of a processor and a receiver. The signal sending unit may be a transmitter.

The channel sensing unit may perform channel sensing before sending data signals and/or reference signals, and determine how to perform channel sensing and whether to send the data signals and/or the reference signals according to a channel sensing result. The signal sending unit may send signals when the channel sensing unit determines to send the data signals and/or the reference signals, and when sending the data signals and/or the reference signals in a predefined time window, does not send any signal or send predefined signals on first time-frequency resources.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for channel sensing and signal transmission on a cell in an unlicensed frequency band channel, the method comprising:
   identifying, by a sending node, whether the unlicensed frequency band channel is idle for a first channel sensing interval; and
   in case that the unlicensed frequency band channel is idle for the first channel sensing interval, transmitting, by a sending node, a discovery signal not including physical downlink shared channel (PDSCH) on a first period in a subframe within a predetermined timing window when a duration of the first period for the transmitting of the discovery signal is less than 1 ms,
   wherein a duration of the subframe corresponds to a duration of 14 orthogonal frequency division multiplexing (OFDM) symbols,
   wherein the duration of the first period corresponds to 12 OFDM symbols of the 14 OFDM symbols within the subframe, and
   wherein a duration of the first channel sensing interval associated with the transmitting of the discovery signal without the PDSCH is equal to or shorter than a duration of a second channel sensing interval associated with a transmitting of the PDSCH.

2. The method of claim 1, wherein the predetermined timing window is a timing window for radio resource management (RRM) measurement.

3. The method of claim 1,
wherein the predetermined timing window is a discovery signals (DRS) measurement timing configuration (DMTC) window.

4. The method of claim 1, wherein a starting symbol and a last symbol of the 12 OFDM symbols are a first cell specific reference signal (CRS) symbol and a second CRS symbol, respectively.

5. The method of claim 1, wherein the duration of the first channel sensing interval includes 25 µs.

6. An equipment for channel sensing and signal transmission on a cell in an unlicensed frequency band channel, the equipment comprising:
   a channel sensing unit; and
   a signal sending unit,
   wherein the channel sensing unit is configured to:
      identify whether the unlicensed frequency band channel is idle for a first channel sensing interval,
   wherein the signal sending unit is configured to:
      in case that the unlicensed frequency band channel is idle for the first channel sensing interval, transmit a discovery signal not including physical downlink shared channel (PDSCH) on a first period in a subframe within a predetermined timing window when a duration of the first period for the transmitting of the discovery signal is less than 1 ms,
   wherein a duration of the subframe corresponds to a duration of 14 orthogonal frequency division multiplexing (OFDM) symbols,
   wherein the duration of the first period corresponds to 12 OFDM symbols of the 14 OFDM symbols within the subframe, and
   wherein a duration of the first channel sensing interval associated with the transmitting of the discovery signal without the PDSCH is equal to or shorter than a duration of a second channel sensing interval associated with a transmitting of the PDSCH.

7. The equipment of claim 6, wherein the predetermined timing window is a timing window for radio resource management (RRM) measurement.

8. The equipment of claim 6, wherein the predetermined timing window is a discovery signals (DRS) measurement timing configuration (DMTC) window.

9. The equipment of claim 6, wherein a starting symbol and a last symbol of the 12 OFDM symbols are a first cell specific reference signal (CRS) symbol and a second CRS symbol, respectively.

10. The equipment of claim 6, wherein the first channel sensing interval includes 25 µs.

* * * * *